(12) United States Patent
Barton

(10) Patent No.: US 10,368,124 B2
(45) Date of Patent: *Jul. 30, 2019

(54) REAL-TIME AUDIENCE MEASUREMENT SYSTEM

(71) Applicant: TiVo Solutions Inc., San Jose, CA (US)

(72) Inventor: James M. Barton, Los Catos, CA (US)

(73) Assignee: TiVo Solutions Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,300

(22) Filed: Dec. 6, 2017

(65) Prior Publication Data

US 2018/0176629 A1    Jun. 21, 2018

Related U.S. Application Data

(63) Continuation of application No. 12/257,352, filed on Oct. 23, 2008, now Pat. No. 9,883,233.

(51) Int. Cl.
| | | |
|---|---|---|
| *H04H 20/40* | (2008.01) | |
| *H04H 60/31* | (2008.01) | |
| *H04H 60/33* | (2008.01) | |
| *H04N 21/435* | (2011.01) | |
| *H04N 21/436* | (2011.01) | |
| *H04H 60/46* | (2008.01) | |
| *H04H 60/61* | (2008.01) | |
| *H04H 60/73* | (2008.01) | |
| *H04N 21/442* | (2011.01) | |
| *H04N 21/466* | (2011.01) | |

(52) U.S. Cl.
CPC .......... *H04N 21/435* (2013.01); *H04H 20/40* (2013.01); *H04H 60/31* (2013.01); *H04H 60/33* (2013.01); *H04H 60/46* (2013.01); *H04H 60/61* (2013.01); *H04H 60/73* (2013.01); *H04N 21/43615* (2013.01); *H04N 21/44222* (2013.01); *H04N 21/4667* (2013.01); *H04H 2201/37* (2013.01)

(58) Field of Classification Search
None
See application file for complete search history.

(56) References Cited

U.S. PATENT DOCUMENTS

2005/0066362 A1 *  3/2005  Rambo .................. H04L 51/04
                                                                      725/43

* cited by examiner

*Primary Examiner* — Nathan J Flynn
*Assistant Examiner* — Christen A Kurien
(74) *Attorney, Agent, or Firm* — Haley Guiliano LLP

(57) ABSTRACT

Techniques for real-time audience measurement are provided. The techniques include instant message protocol in a DVR environment to obtain real-time audience measurement data to modify the scheduled recording time of a media content in real-time, to bookmark in real-time, and to gather audience ratings on commercials and viewership in real-time.

18 Claims, 27 Drawing Sheets

FIG. 1: A Distributed Television Viewing Management System

FIG. 2: Structure of a Viewing Object

FIG. 3: Structure of an Object Schema

FIG. 4: Traversing a Directory Graph

FIG. 5: Processing Preference Information

FIG. 6: Scheduling Recordings

FIG. 7: Scheduling a Recording

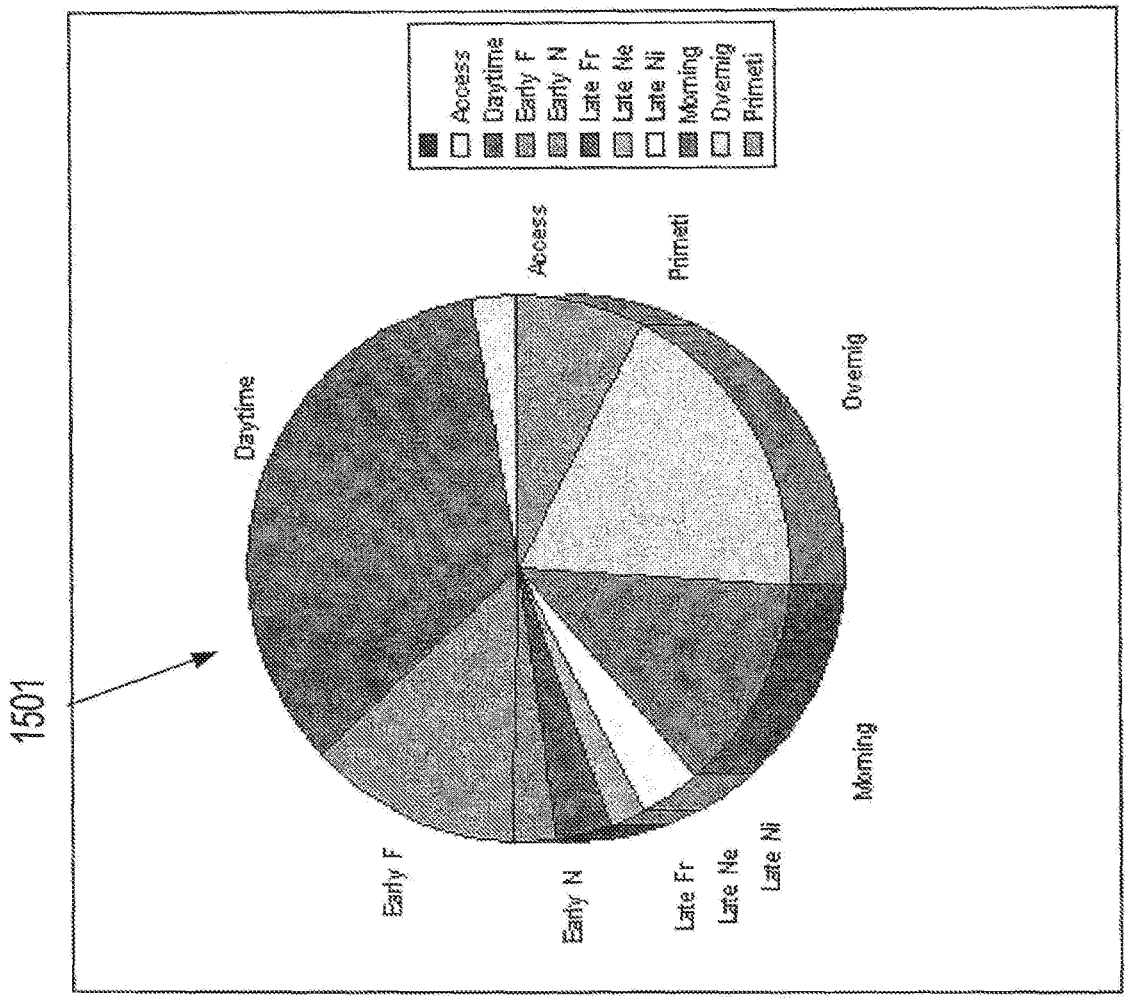

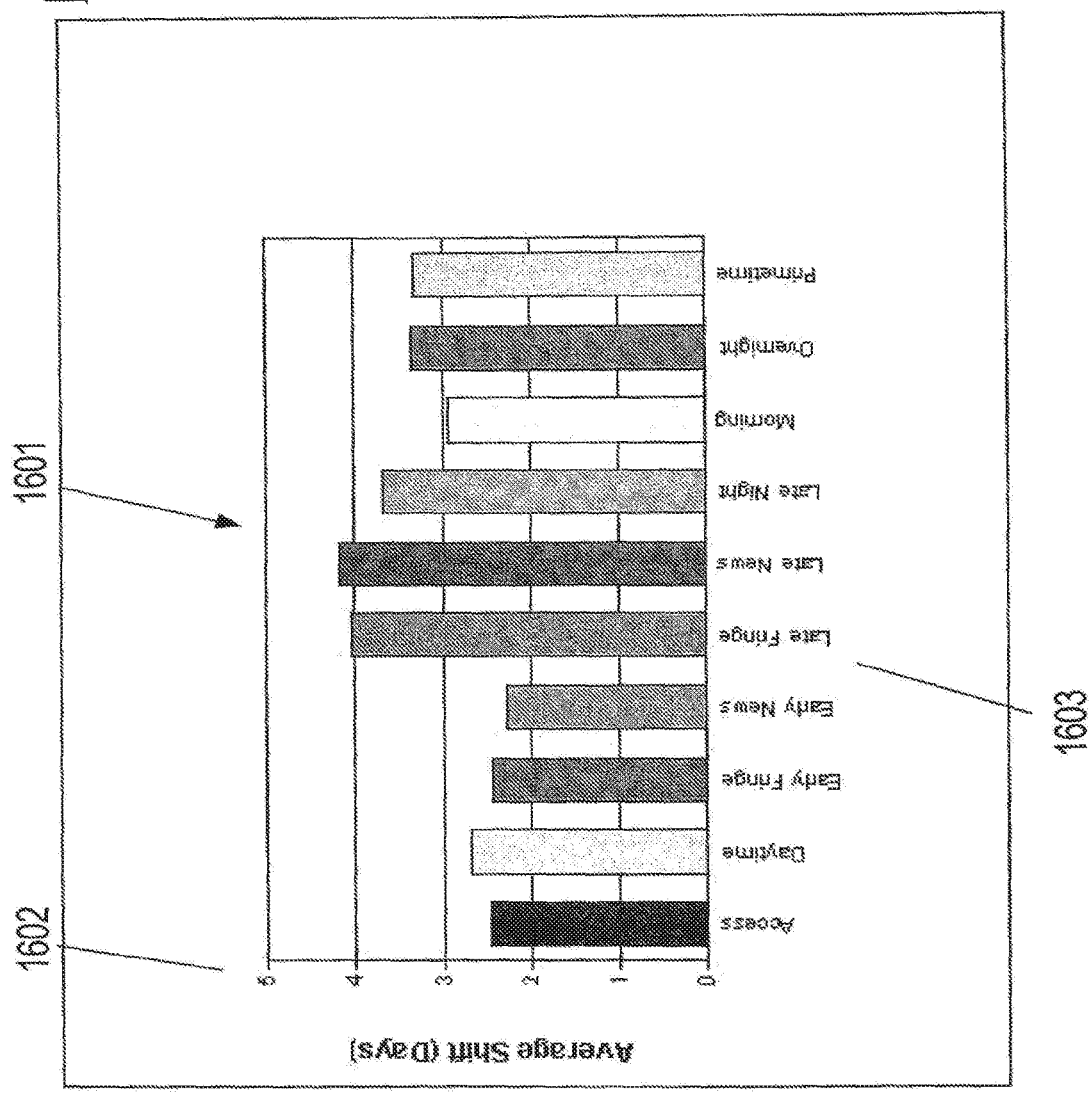

Fig. 17A
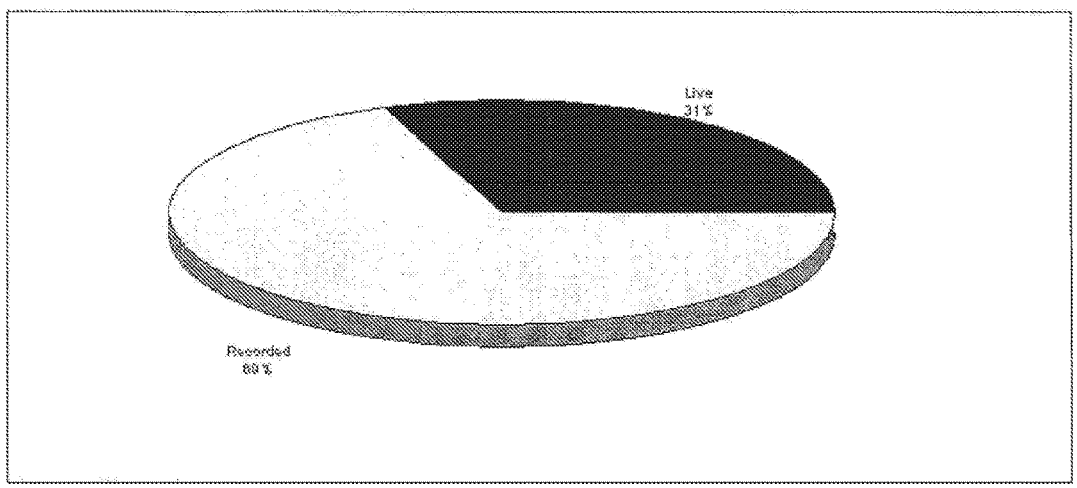
SPORTS — 1701
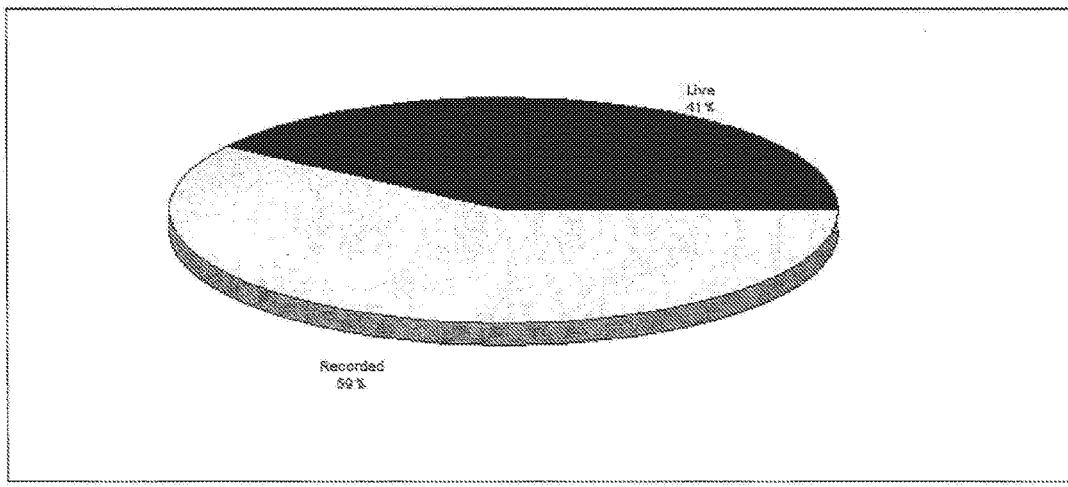
AWARDS — 1702

Fig. 17B
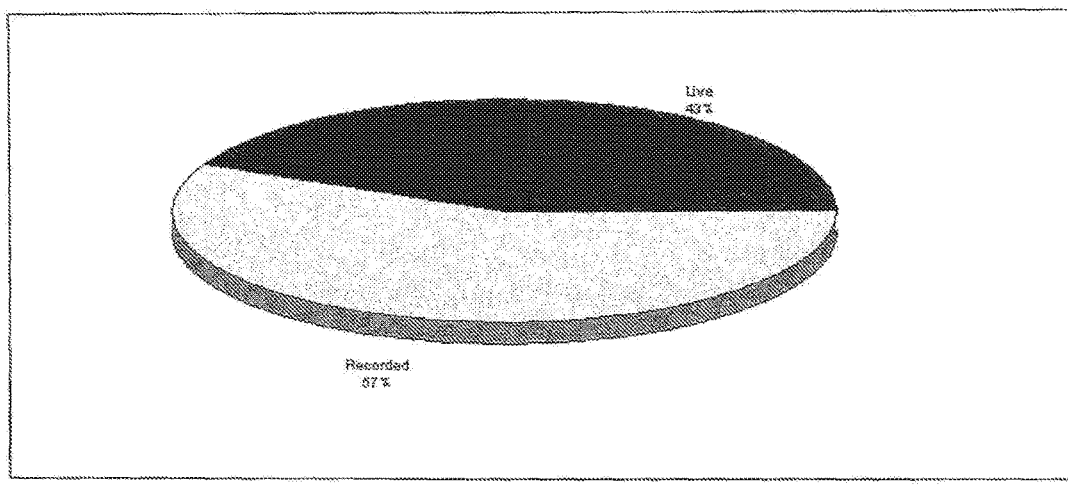
CHILDREN — 1703
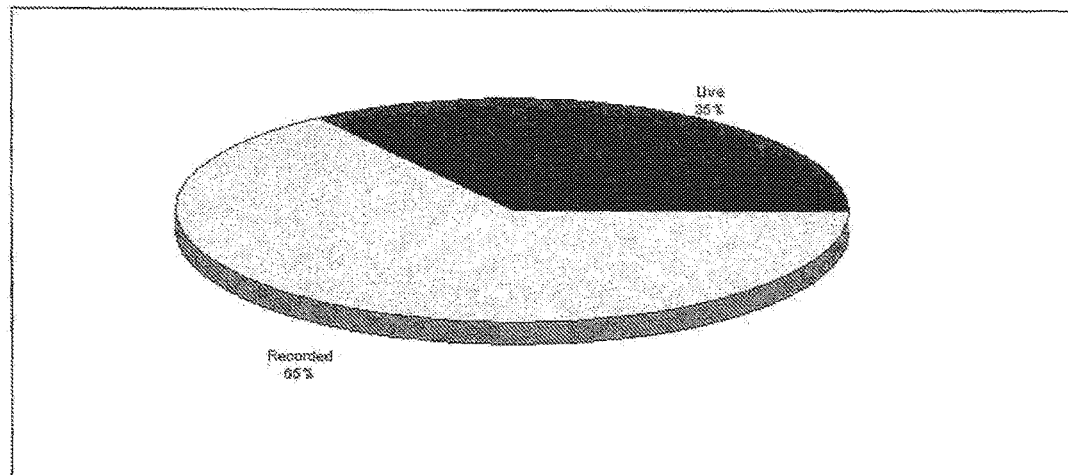
COMEDY — 1704

Fig. 17C
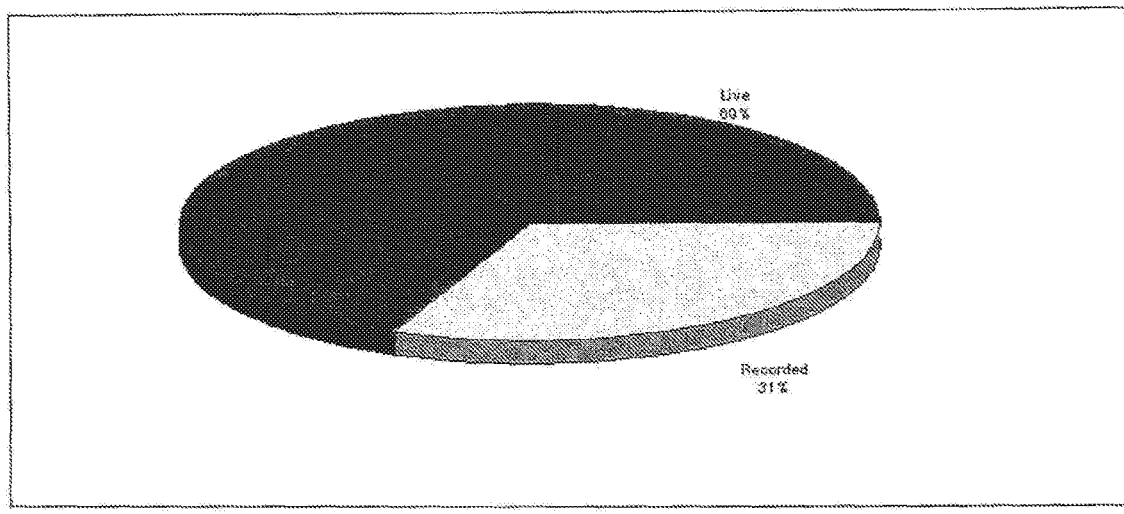
DOCUMENTARY — 1705
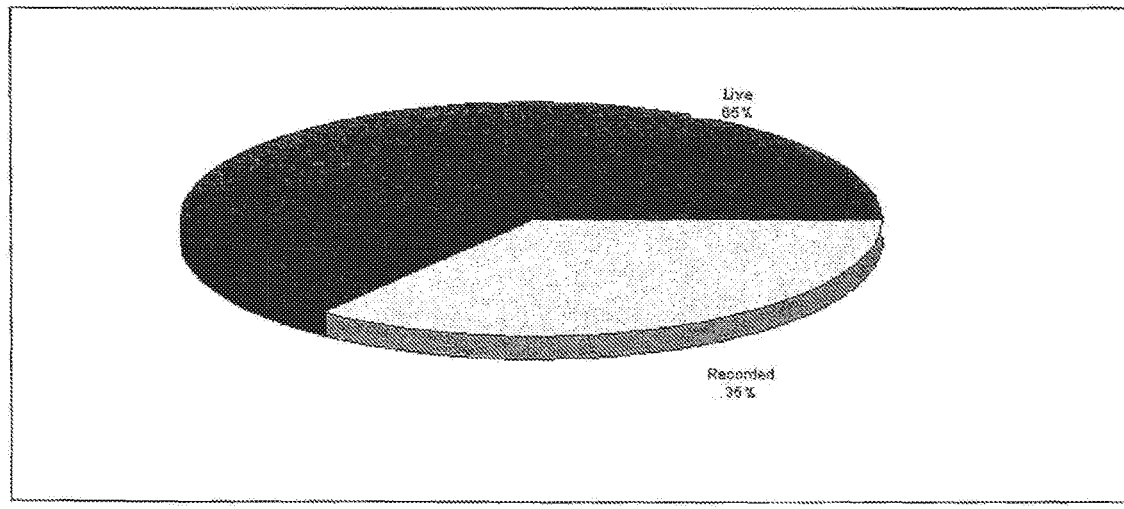
DRAMA — 1706

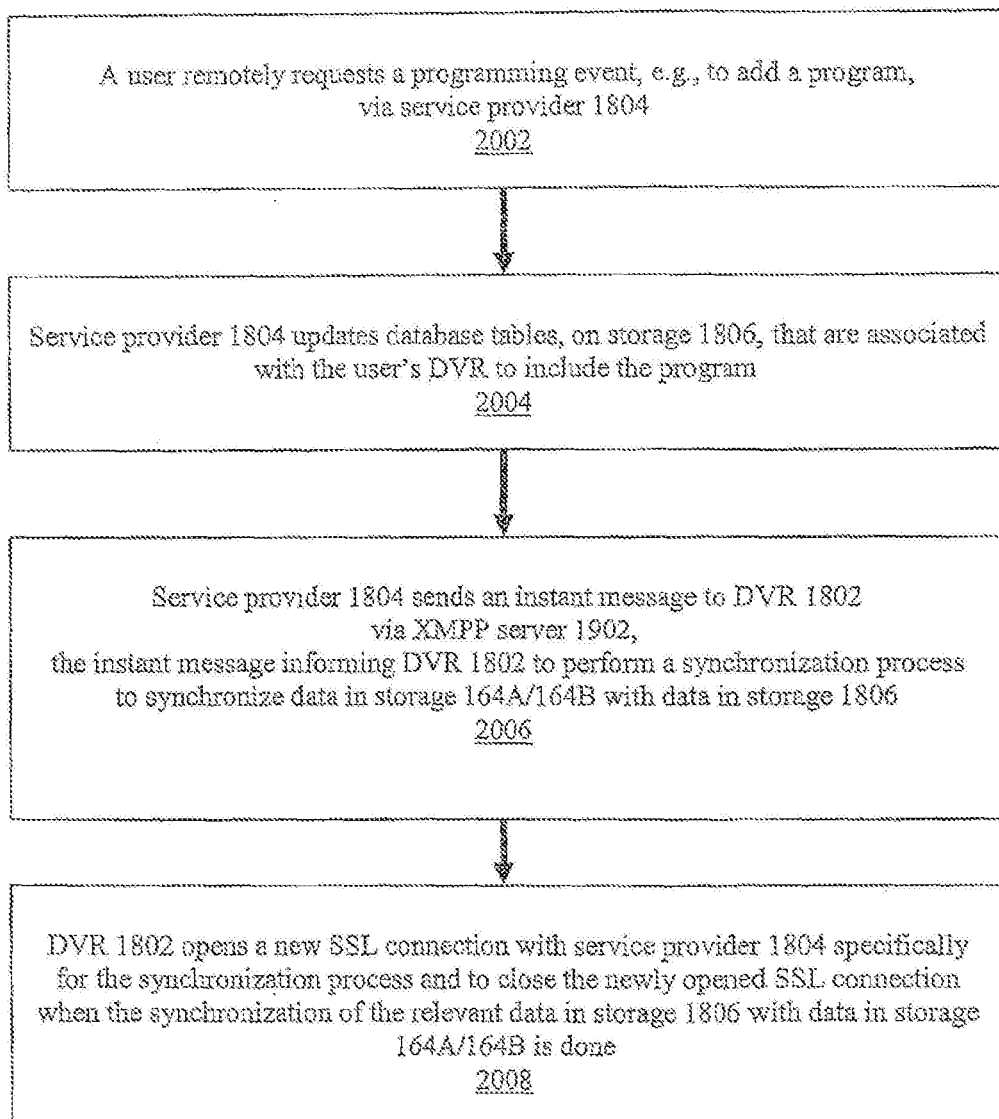

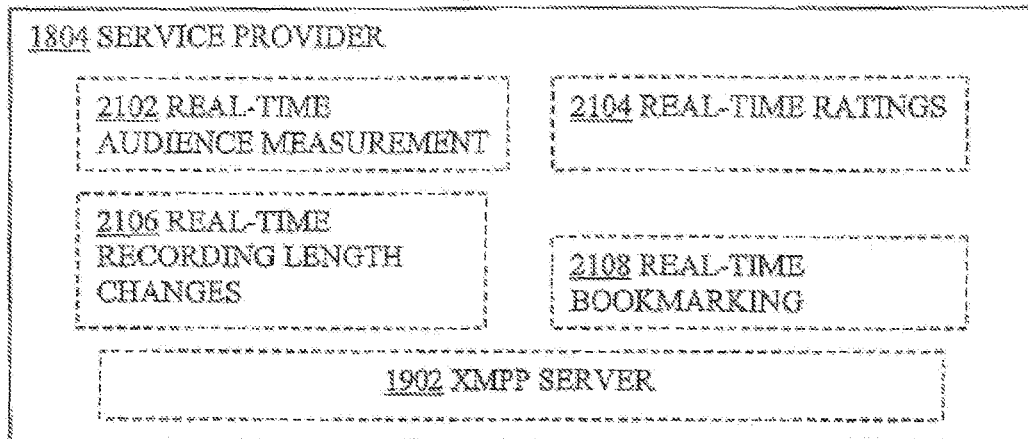
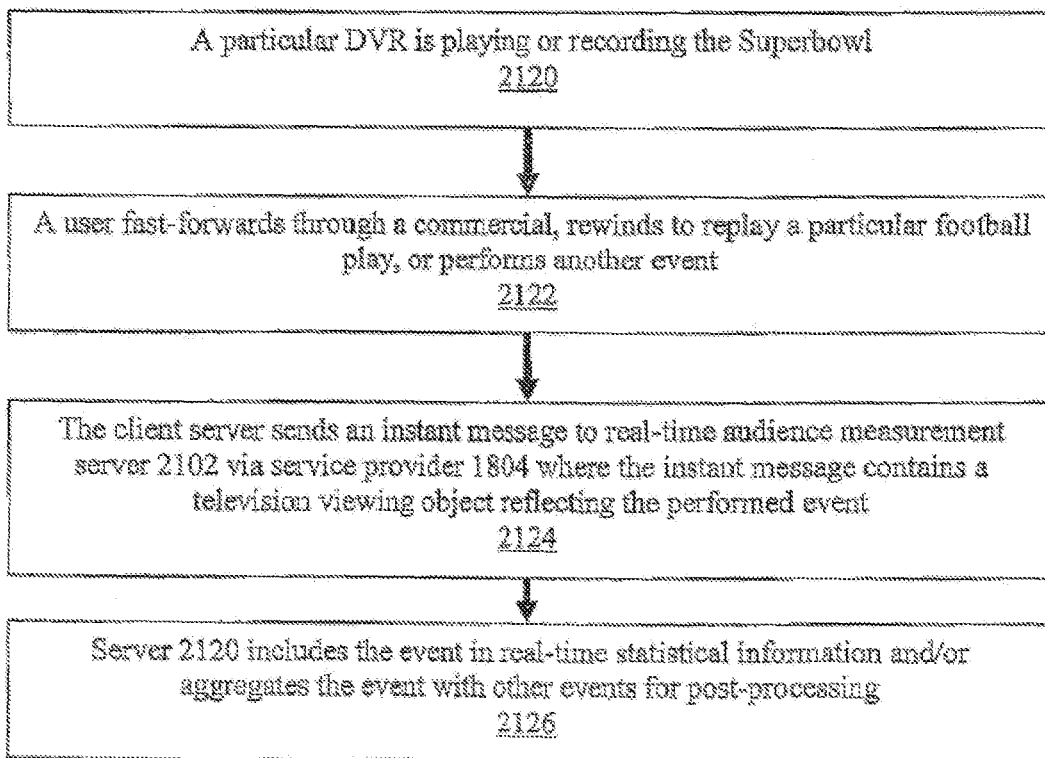

REAL-TIME AUDIENCE MEASUREMENT SYSTEM

CROSS-REFERENCE TO RELATED APPLICATIONS

This application is a continuation of U.S. patent application Ser. No. 12/257,352, filed Oct. 23, 2008, now U.S. Pat. No. 9,883,233. The contents of which is hereby incorporated by reference in its entirety.

This application is related to U.S. patent application Ser. No. 10/189,989, filed Jul. 5, 2002, issued as U.S. Pat. No. 8,943,527, which claims priority from U.S. Provisional Patent Application Ser. No. 60/303,179, filed on Jul. 5, 2001, and which is a Continuation-in-part of U.S. patent application Ser. No. 09/422,121, filed Oct. 20, 1999, issued as U.S. Pat. No. 7,665,111. Each application of which is incorporated by reference in its entirety as if fully set forth herein. This application is related to U.S. patent application Ser. No. 12/347,897, filed Dec. 31, 2008, issued as U.S. Pat. No. 9,113,195, which is incorporated by reference in its entirety as if fully set forth herein.

FIELD OF TECHNOLOGY

The present invention relates to digital video recorders ("DVRs"). An embodiment relates more specifically to real-time audience measurement in a DVR environment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The introduction of the Digital Video Recorder (DVR) to the consumer world has revolutionized the way viewers watch and record television programs. DVRs eliminate the complications of VCRs and the need for video tapes. DVRs record television programs on a hard drive that is capable of storing a large number of television programs. Because DVRs are usually box-like in shape, and are often found sitting on top of the television sets to which they are connected, DVRs typically are included in the broad category of devices now called "set-top boxes." Much like VCRs, DVRs receive one or more television signals as input from cables or satellite dishes, (or, in some cases, unlike VCRs, from broadband network connections) and also output television signals to a television set or other display.

At least one such DVR automatically records several television programs in advance of the time that a user will watch those television programs. After one or more television programs have been recorded and stored on a hard drive, the DVR presents, to the user, through the television set, a user interface that identifies the television programs which currently are available for viewing. This user interface comprises a menu that allows the user to select, using a remote control device for the DVR, one of the currently recorded television programs. In DVRs produced by TiVo Inc., this menu is often called the "now playing" menu.

After a user selects a recorded television program, the DVR plays the selected television program to the user by reading the appropriate digital recording from the hard drive and sending a corresponding signal to the television set. While the television program is being played to the user, the DVR also receives signals from the user's remote control. Through the remote control, a user may instruct the DVR to perform various operations relative to the television program. For example, the user may instruct the DVR to play the television program backward for a desired period of time ("rewind"). The user may play the television program forward with greater than usual speed ("fast forward"). The user may play the television program forward with slower than usual speed. The user may cause the currently displayed video frame of the television program to be displayed indefinitely ("pause"), or stop the playing of the television program entirely. In this manner, the user may temporally traverse the television program however the user likes.

BRIEF DESCRIPTION OF THE DRAWINGS

The present invention is illustrated by way of example, and not by way of limitation, in the figures of the accompanying drawings and in which like reference numerals refer to similar elements and in which:

FIG. 15 is a schematic diagram of a chart that shows the total number of recordings categorized by the daypart during which a recording was made according to an embodiment;

FIG. 16 is a schematic diagram of a chart that shows what kind of programs are likely to be timeshifted according to an embodiment;

FIGS. 17A, 17B, and 17C are schematic diagrams of a chart that shows the amount of live broadcasts that are being viewed vs. timeshifted recordings according to an embodiment;

FIG. 20A is a flow diagram showing an example DVR/service provider synchronization process flow according to an embodiment;

FIG. 21A is a block diagram depicting the service provider including a real-time audience measuring server, a real-time ratings server, a real-time recording length changes server, a real-time bookmarking server, and a real-time DVR usage and reporting server according to an embodiment;

FIG. 21B is a flow diagram showing an example using a real-time audience measuring server according to an embodiment.

DETAILED DESCRIPTION OF EXAMPLE EMBODIMENTS

A method and apparatus for real-time audience measurement is described. In the following description, for the purposes of explanation, numerous details are set forth in order to provide a thorough understanding of the present invention. It will be apparent, however, that the present invention may be practiced without such details. In other instances, well-known structures and devices are shown in block diagram form in order to avoid unnecessarily obscuring the present invention.

It should be appreciated that each of the following applications is incorporated by reference in its entirety as if fully set forth herein: U.S. patent application Ser. No. 10/189,989 entitled, "Audience Measurement System," filed Jul. 5, 2002, which claims priority from U.S. Provisional Patent Application Ser. No. 60/303,179, filed on 5 Jul. 2001, and which is a Continuation-in-part of U.S. patent application Ser. No. 09/422,121, filed on 20 Oct. 1999, which claims priority from U.S. Provisional Patent Application Ser. No. 60/127,178, filed 30 Mar. 1999. Further, it should be appreciated that each of the applications above was commonly owned at the time the claimed subject matter was made.

An embodiment comprises an audience measurement system. A system according to an embodiment monitors viewer habits and preferences for live and recorded television program material. In addition, an embodiment comprises a system that protects viewer identities while aggregating such information.

An embodiment comprises a television viewing information transmission and collection system that improves the ability of the individual viewer to select and automatically timeshift television programs while providing opportunities for a service provider to enhance and direct the viewing experience. An embodiment comprises a system which is fully distributed, in that calculations pertaining to an individual viewer are performed personally for that viewer within a local client device, while providing for the reliable aggregation and dissemination of information concerning viewing habits, preferences or purchases.

The Database of Television Viewing Information

Figure 1:
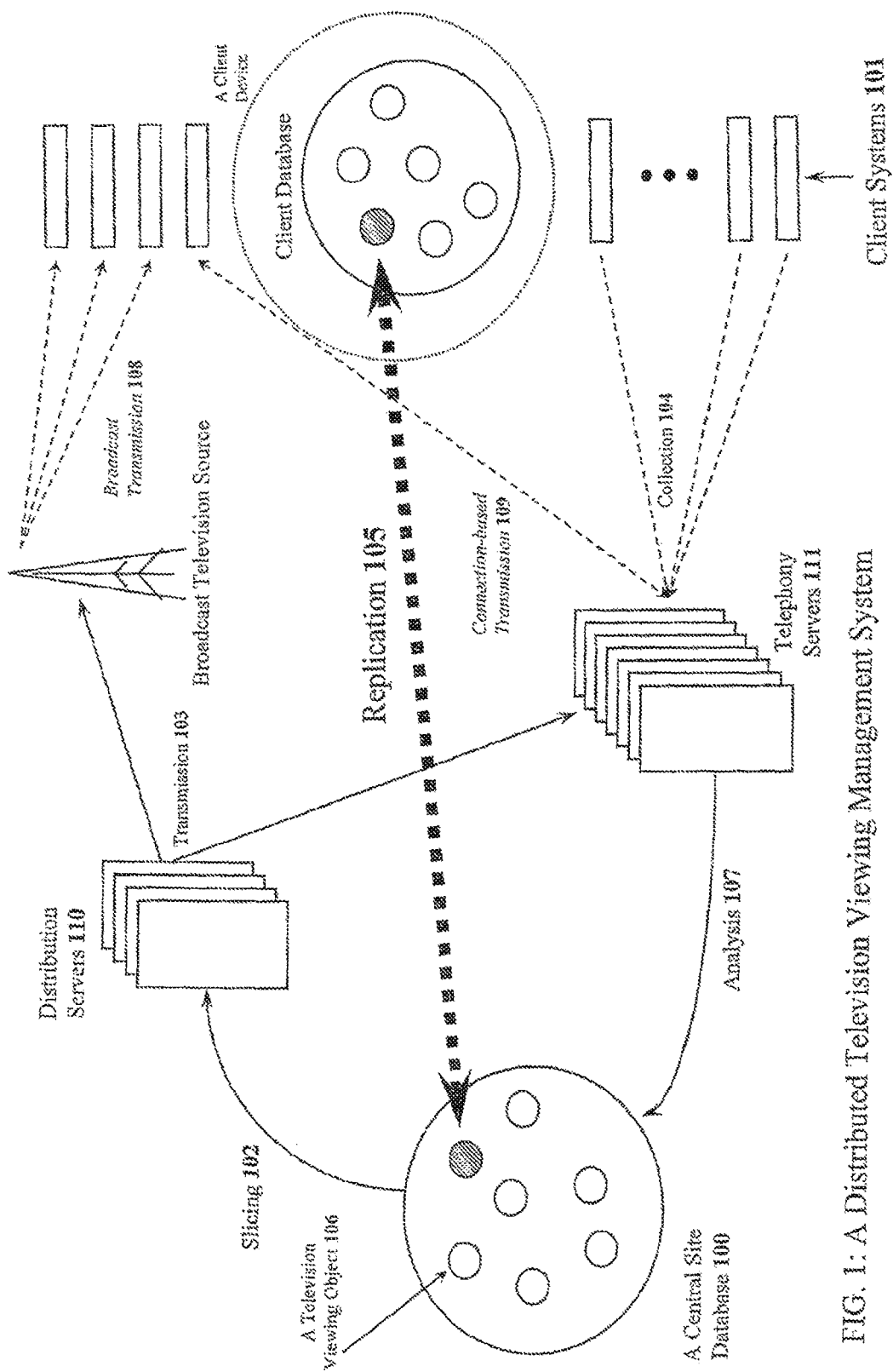
FIG. 1 is a block schematic diagram of a preferred embodiment of a distributed television viewing management system according to an embodiment.

FIG. 1 gives a schematic overview of an embodiment. Central to an embodiment is a method and apparatus for maintaining a distributed database of television viewing information among computer systems at a central site 100 and an extremely large number of client computing systems 101. The process of extracting suitable subsets of the central copy of the database is called "slicing" 102, delivering the resulting "slices" to clients is called "transmission" 103, delivering information collected about or on behalf of the viewer to the central site is called "collection" 104, and processing the collected information to generate new television viewing objects or reports is called "analysis" 107; in all cases, the act of recreating an object from one database within another is called "replication" 105. Data items to be transmitted or collected are termed "objects" 106, and the central database and each replicated subset of the central database contained within a client device is an "object-based" database. The objects within this database are often termed "television viewing objects", "viewing objects", or simply "objects", emphasizing their intended use. However, in an embodiment, objects can be any type of data.

The viewing object database provides a consistent abstract software access model for the objects it comprises, independent of and in parallel with the replication activities described herein. By using this interface, applications may create, destroy, read, write and otherwise manipulate objects in the database without concern for underlying activities and with assurance that a consistent and reliable view of the objects in the database and the relationships between them is always maintained.

Basic Television Viewing Object Principles

Figure 2:
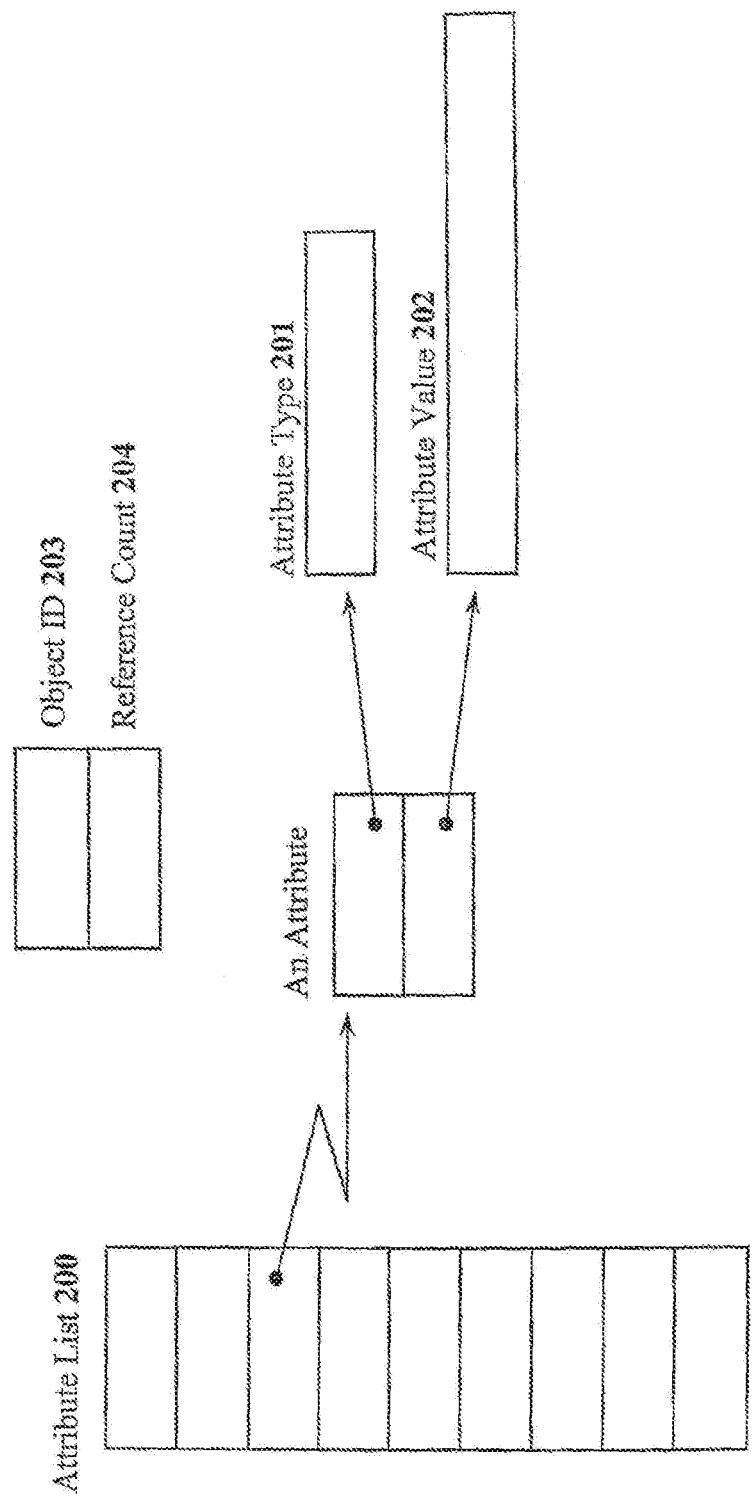
FIG. 2 is a block schematic diagram of the structure of a viewing object in computer storage for programmatic access according to an embodiment.

Referring to FIG. 2, television viewing objects are structured as a collection of "attributes" 200. Each attribute has a type 201, e.g., integer, string or boolean, and a value 202. All attribute types are drawn from a fixed pool of basic types supported by the database.

The attributes of an object fall into two groups: "basic" attributes, which are supplied by the creator or maintainer of the viewing object; and "derived" attributes, which are automatically created and maintained by mechanisms within the database. Basic attributes describe properties of the object itself; derived attributes describe the relationships between objects. Basic attributes are replicated between databases, whereas derived attributes are not.

Figure 3:
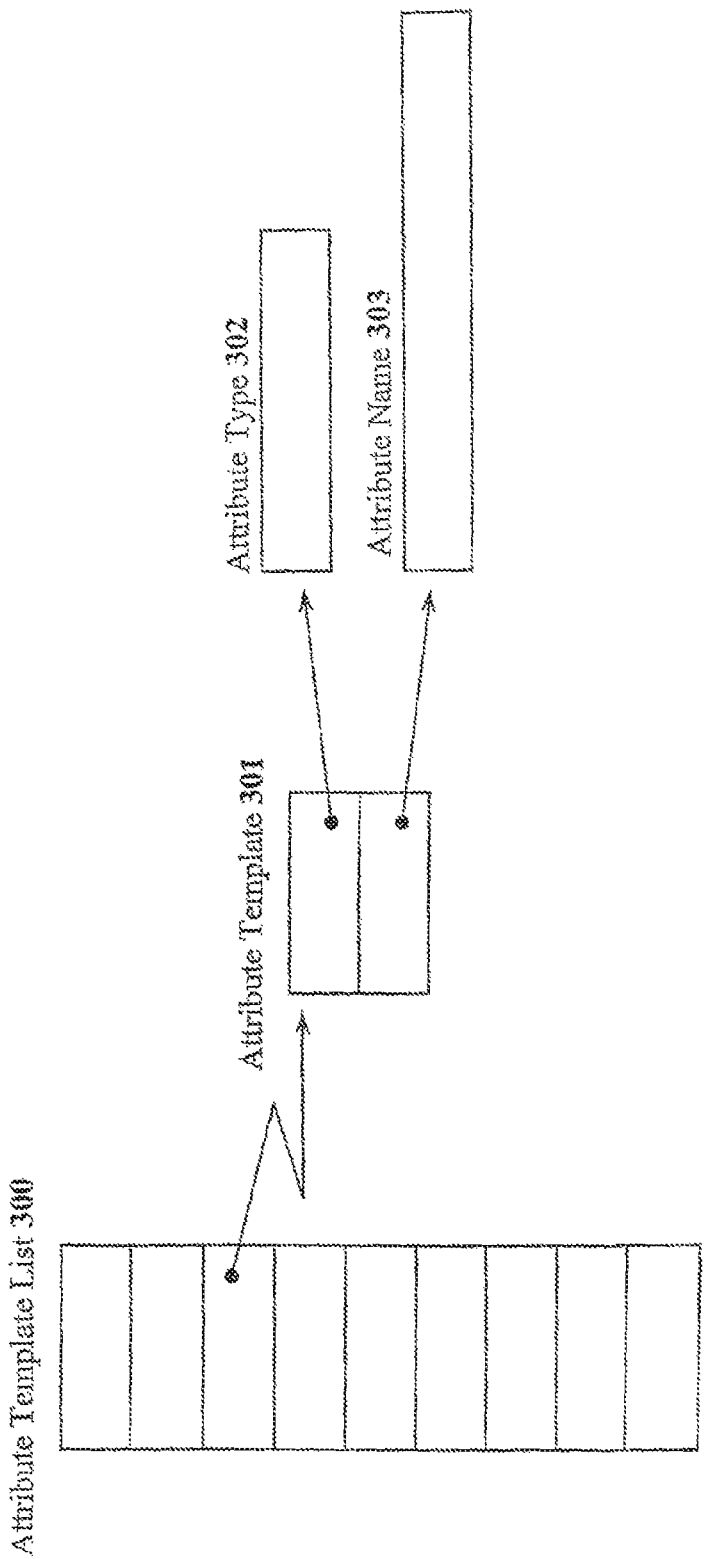
FIG. 3 is a block schematic diagram showing how the schema for a viewing object is structured in computer storage for programmatic access according to an embodiment.

With respect to FIG. 3, there is a small set of fundamental object types defined by an embodiment; each object type is represented as a specific set of related attributes 300, herein called a "schema". The schema defines a template for each attribute type 301, which includes the type 302 and name of the attribute 303. Actual television viewing objects are created by allocating resources for the object and assigning values to the attributes defined by the schema. For example, a "program" schema might include attributes such as the producer, director or actors in the program, an on-screen icon, a multi-line description of the program contents, an editorial rating of the program, etc. A physical program object is created by allocating storage for it, and filling in the attributes with relevant data.

There is one special object type predefined for all databases called the schema type. Each schema supported by the database is represented by a schema object. This allows an application to perform "introspection" on the database, e.g., to dynamically discover what object types are supported and their schema. This greatly simplifies application software and avoids the need to change application software when schemas are changed, added or deleted. Schema objects are handled the same as all other viewing objects under the methods of this invention.

Referring again to FIG. 2, each object in a database is assigned an "object ID" 203 which is unique within the database. This object ID may take many forms, as long as each object ID is unique. An embodiment uses a 32-bit integer for the object ID, as it provides a useful tradeoff between processing speed and number of unique objects allowed. Each object also includes a "reference count" 204 which is an integer giving the number of other objects in the database which refer to the current object. An object with a reference count of zero will not persist in the database (see below).

One specific type of viewing object is the "directory" object. A directory object maintains a list of object IDs and an associated simple name for the object. Directory objects may include other directory objects as part of the list, and there is a single distinguished object called the "root" directory. The sequence of directory objects traversed starting at the root directory and continuing until the object of interest is found is called a "path" to the object; the path thus indicates a particular location within the hierarchical namespace created among all directory objects present in the database. An object may be referred to by multiple paths, meaning that one object may have many names. The reference count on a viewing object is incremented by one for each directory which refers to it.

Methods for the Maintenance of Database Consistency and Accuracy

One of the features of an embodiment is to insure that each database replica remains internally consistent at all times, and that this consistency is automatically maintained without reference to other databases or the need for connection to the central site. There is no assurance that transmission or collection operations happen in a timely manner or with any assured periodicity. For instance, a client system may be shut off for many months; when a transmission to the system is finally possible, the replication of objects results in a consistent subset of the server database, even if it is not possible to transmit all objects needed to bring the central and client databases into complete synchronization.

Even more serious, there can be no guarantee of a stable operational environment while the database is in use or being updated. For example, electrical power to the device may cease. This invention treats all database updates as "transactions", meaning that the entire transaction will be completed, or none of it will be completed. The specific technique chosen is called "two-phase commit", wherein all elements of the transaction are examined and logged, followed by performing the actual update. One familiar in the art will appreciate that a standard journaling technique, where the transaction is staged to a separate log, combined with a roll-forward technique which uses the log to repeat partial updates that were in progress when the failure occurred, is sufficient for this purpose.

One required derived attribute of every object is the "version", which changes with each change to the object; the version attribute may be represented as a monotonically increasing integer or other representation that creates a monotonic ordering of versions. The schema for each object that may be replicated includes an attribute called "source version" which indicates the version of the object from which this one was replicated.

Transmission of a viewing object does not guarantee that every client receives that object. For instance, while the object is being broadcast, external factors such as sunspots, may destroy portions of the transmission sequence. Viewing objects may be continually retransmitted to overcome these problems, meaning that the same object may be presented for replication multiple times. It is inappropriate to simply update the database object each time an object to be replicated is received, as the version number will be incremented although no change has actually occurred. Additionally, it may be desirable to avoid initiating a transaction to update an object as considerable system resources may be consumed during a transaction.

Two approaches are combined to resolve this problem. First, most objects will have a basic attribute called "expiration". This is a date and time past which the object is no longer valid, and should be discarded. When a new object is received, the expiration time is checked, and the object discarded if it has expired. Expiration handles objects whose transmission is delayed in some fashion, but it does not handle multiple receptions of the same unexpired object.

The source version attribute handles this problem. When a viewing object is transmitted, this attribute is copied from the current version attribute of the source object. When the viewing object is received, the source version of the received object is compared with the source version of the current object. If the new object has a higher source version attribute, it is copied over the existing object, otherwise it is discarded.

It is assumed that a much greater number of viewing objects are transmitted than are of interest to any particular client system. For example, a "channel" viewing object which describes the channels on a particular cable system is of no interest to clients attached to other cable systems. Because of the overhead of capturing and adding new objects to the database, it would be advantageous for received objects to be filtered on other attributes in addition to those described above. An embodiment accomplishes this by using a filtering process based on object type and attribute values. In one implementation, this filtering process is based on running executable code of some kind, perhaps as a sequence of commands, which has been written with specific knowledge of various object types and how they should be filtered.

In an embodiment, a "filter" object is defined for each object type which indicates what attributes are required, should not be present, or ranges of values for attributes that make it acceptable for addition to the database. Thus filter object may comprise executable code in some form, perhaps as a sequence of executable commands. These commands would examine and compare attributes and attribute values of object being filtered, resulting in an indication of whether the object should be the subject of further processing.

Viewing objects are rarely independent of other objects. For example, a "showing" object (describing a specific time on a specific channel) is dependent on a "program" object (describing a specific TV program). One important aspect of maintaining consistency is to insure that all dependent objects either already exist in the database or are to be added as part of a single transaction before attempting to add a new viewing object. This is accomplished using a basic attribute of the new viewing object called the "dependency" attribute, which simply lists the object IDs and source versions of objects that the new object is dependent on. Clearly, new versions of an object must be compatible, in the sense that the schema defining new versions be the same or have a strict superset of the attributes of the original schema.

When a new viewing object is received, the database is first checked to see if all dependencies of that object are present; if so, the object is added to the database. Otherwise, the new object is "staged", saving it in a holding area until all dependent objects are also staged. Clearly, in order for a new set of viewing objects to be added to the database, the dependency graph is closed between objects in the staging area and objects already existing in the database, based on both object ID and source version. Once closure is achieved, meaning all dependent objects are present, the new object(s) are added to the database in a single atomic transaction.

Naming and Finding Television Viewing Objects

Figure 4:
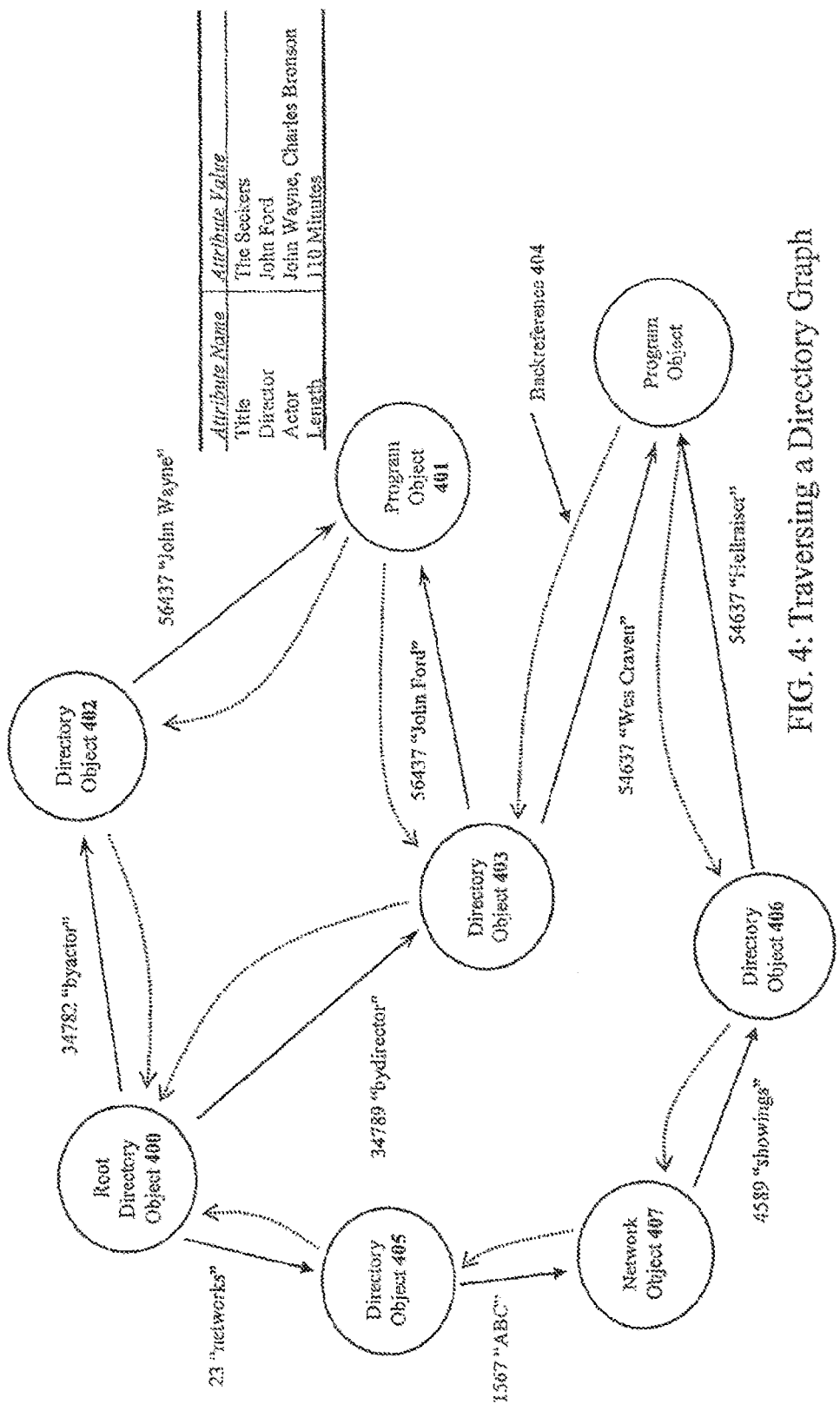
FIG. 4 is a block schematic diagram showing an example graph of relationships between viewing objects which describe information about programs according to an embodiment.

Directory objects have been described previously. Referring to FIG. 4, the collection of directory objects, and the directed graph formed by starting at the root path 400 and enumerating all possible paths to viewing objects is called a "namespace". In order for an object to be found without knowing a specific object ID, one or more paths within this namespace refers to it. For instance, application software has little interest in object IDs, instead the software would like to refer to objects by paths, for instance "/tvschedule/today". In this example, the actual object referred to may change every day, without requiring changes in any other part of the system.

One way in which a path to an object may be established is by specifying a "pathname" basic attribute on the object. The object is added to the database, and directory objects describing the components of the path are created or updated to add the object. Such naming is typically used only for debugging the replication mechanisms. Setting explicit paths is discouraged, since the portions of the central database replicated on each client system will be different, leading to great difficulty in managing pathnames among all replicas of the database.

A method for adding an object to the database namespace is called "indexing". In an embodiment, an "indexer" object is defined for each object type which indicates what attributes are to be used when indexing it into the database namespace. Such indexer object may comprise executable code in some form, perhaps as a sequence of executable commands. These commands would examine and compare attributes and attribute values of object being indexed, resulting in an indication of where the object should be located in the namespace.

Based on the object type, the indexer examines a specific set of attributes attached to the object. When such attributes are discovered the indexer automatically adds a name for the object, based on the value of the attribute, within the hierarchical namespace represented by the graph of directories in the database. Referring again to FIG. 4, a program object may have both an "actor" attribute with value "John Wayne" and a "director" attribute with value "John Ford" 401. The root directory might indicate two sub-directories, "byactor" 402 and "bydirector" 403. The indexer would then add the paths "/byactor/John Wayne" and "/bydirector/John Ford" to the database, both of which refer to the same object 401.

A derived attribute is maintained for each object listing the directory objects which refer to this object 404. As the indexer adds paths to the namespace for this object, it adds the final directory ID in the path to this list. This insures closure of the object graph—once the object has been found, all references to that object within the database are also found, whether they are paths or dependencies.

This unique and novel method of adding objects to the database has significant advantages over standard approaches. The indexer sorts the object into the database when it is added. Thus, the search for the object associated with a particular path is a sequence of selections from ordered lists, which can be efficiently implemented by one familiar with the art.

Deleting Objects from the Database

While the rules for adding objects to the database are important, the rules for removing objects from the database are also important in maintaining consistency and accuracy. For example, if there were no robust rules for removing objects, the database might grow unboundedly over time as obsolete objects accumulate.

The cardinal rule for deleting objects from the database is based on reference counting; an object whose reference count drops to zero is summarily deleted. For instance, this means that an object is referred to by a directory or some other object to persist in the database. This rule is applied to all objects in the closed dependency graph based on the object being deleted. Thus, if an object which refers to other objects (such as a directory) is deleted, then the reference count on all objects referred to is decremented, and those objects similarly deleted on a zero count, and so forth.

There is also an automatic process which deletes objects from the database called the "reaper". Periodically, the reaper examines all objects in the database, and depending on the object type, further examines various attributes and attribute values to decide if the object should be retained in the database. For example, the expiration attribute may indicate that the object is no longer valid, and the reaper will delete the object.

In an embodiment, using a method similar to (or perhaps identical to) the filtering and indexing methods described above, the reaper may instead access a reaper object associated with the object type of the current object, which may comprise executable code of various kinds, perhaps a sequence of executable commands. This code examines the attributes and attribute values of the current object, and determines if the object should be deleted.

The overhead of individually deleting every object for which the reference count has been decremented to zero may be quite high, since every such deletion results in a transaction with the database. It would be advantageous to limit the performance impact of reaping objects, such that foreground operations proceed with maximum speed. In an embodiment, this is accomplished using a technique based on common garbage collection methods.

For instance, instead of deleting an object whose reference count has been decremented to zero, the reaper performs no other action. Periodically, a background task called the garbage collector examines each object in the database. If the object has a reference count of zero, it is added to a list of objects to be deleted. In one embodiment, once the garbage collector has examined the entire database, it would delete all such objects in a single transaction. One familiar in the art will appreciate that this method may also result in a significant performance penalty, as other accesses to the database may be delayed while the objects are being deleted. In addition, if all objects are to be properly deleted, changes to the database may have to be delayed while the garbage collector is active, resulting in even worse performance.

In an embodiment, the garbage collector examines the database in a series of passes. Once a specific number of objects has been collected, they are deleted in a single transaction. Said process continues until all objects have been examined. This technique does not guarantee that all garbage objects are collected during the examination process, since parallel activities may release objects previously examined. These objects will be found, however, the next time the garbage collector runs. The number of objects deleted in each pass is adjustable to achieve acceptable performance for other database activities.

Operations on the Distributed Television Viewing Object Database

Considerations in Maintaining the Distributed Viewing Object Database

The replication of television viewing objects among the instances of the distributed database necessarily requires the transmission of objects over unreliable and unsecure distribution channels.

For example, if the objects are transmitted over a broadcast mechanism, such as within a radio or television transmission, there can be no assurance that the data is transmitted accurately or completely. Weather, such as rainstorms, may cause dropouts in the transmission. Other sources of interference may be other broadcast signals, heavy equipment, household appliances, etc.

There are standard techniques for managing the transmission of data over unreliable channels, including repeated transmissions, error correcting codes, and others, which may be used for transmission, any or all of which may be used in any particular instance.

For efficiency, objects to be replicated are gathered together into distribution packages, herein called "slices". A slice is a subset of the television viewing object database which is relevant to clients within a specific domain, such as a geographic region, or under the footprint of a satellite transmitter.

Security of these slices is quite important. Slices are used to add objects to the database which are used to provide valuable services to users of the database, as well as to store information that may be considered private or secret. Because of the broadcast-oriented nature of slice transmission, slices may be easily copied by third parties as they are transmitted. A practical solution to these problems is to encrypt the slice during transmission. An ideal reference text on the techniques employed in an embodiment is "Applied Cryptography: Protocols, Algorithms, and Source Code in C" by Bruce Schneier, John Wiley and Sons, 1995.

In an embodiment, a secure, encrypted channel is established using techniques similar to those described in U.S. Pat. No. 4,405,829, often described as asymmetric key encryption, or sometimes public/private key pair encryption. Protocols based on asymmetric key encryption serves as a reliable and efficient foundation for authentication of client devices and secure distribution of information. In general, authentication is provided using an exchange of signed messages between the client and central systems. Secure distribution is provided by encrypting all communications using a short-lived symmetric key sent during an authentication phase.

Successful security requires that sender and receiver agree beforehand on the asymmetric key pair to be used for encryption. Such key distribution is the weakest link in any cryptographic system for protecting electronic data. U.S. Pat. No. 6,385,739, entitled "Self-Test Electronic Assembly and Test System," filed Jul. 19, 1999, also owned by the Applicant, describes a mechanism whereby the client device generates the asymmetric key pair automatically as the final step in the manufacturing process. The private key thus generated is stored within a secure microprocessor embedded within the client device, such that the key is never presented to external devices. The public key thus generated is transmitted to a local manufacturing system, which records the key along with the client serial number in a secure database. This database is later securely transmitted to the central distribution system, where it is used to perform secure communications with the client.

This unique and novel application of key generation solves the problem of key distribution, as the private key is never presented to external components in the client, where it might be discerned using special tools, such as a logic analyzer. Instead, it may only be used within the security microprocessor itself to decrypt messages originally encrypted with the public key, the results of which are then provided to external components.

The remainder of this discussion assumes that all communications between client and central systems are authenticated and encrypted as described above.

Transmitting Viewing Objects to the Client Systems

Referring again to FIG. 1, in an embodiment the following steps constitute "transmission" of television viewing objects from the central database using slices:

1. There may be many mechanisms for transmitting slices to the universe of client viewing devices. For instance, the slices may be directly downloaded over a telephone modem or cable modem 109, they may be modulated into lines of the Vertical Blanking Interval (VBI) of a standard television broadcast 108, or added to a digital television multiplex signal as a private data channel. Any mechanism which may transmit digital information may be used to transmit slices of the television viewing object database.

The first step in preparing television viewing objects for transmission is recognizing the transmission mechanism to be used for this particular instance, and creating a slice of a subset of the database that is customized for that mechanism. For example, the database may comprise television viewing objects relating to all programs in the country. However, if television viewing objects are to be sent using VBI modulation on a local television signal, only those television viewing objects relating to programs viewable within the footprint of the television broadcast being used to carry them should be contained within the relevant slice. Alternatively, if some of the television viewing objects comprise promotional material related to a particular geographic region, those objects should not be transmitted to other geographic regions.

In an embodiment, the speed and periodicity of traversing the database and generating slices for transmission is adjustable in an arbitrary fashion to allow useful cost/performance tradeoffs to be made. For instance, sliced may be created for certain transmission methods every other day or every hour.

The final step in preparing each slice is to encrypt the slice using a short-lived symmetric key. Only client devices which have been authenticated using secure protocols will have a copy of this symmetric key, making them able to decrypt the slice and access the television viewing objects within it.

2. Once a slice is complete, it is copied to the point at which the transmission mechanism can take and send the data 110. For telephone connections, the slice is placed on a telephony server 111 which provides the data to each client as it calls in. If television broadcast is used, the slice is copied onto equipment co-resident with the station television transmitter, from whence it is modulated onto the signal. In these and similar broadcast-oriented cases, the slice is "carouseled", e.g., the data describing the slice is repeated continually until a new slice is provided for transmission.

This repetitive broadcast of slices is required because there can be no assurance that the signal carrying the data arrives reliably at each client. The client device may be powered off, or there may be interference with reception of the signal. In order to achieve a high degree of probability that the transmitted slices are properly received at all client devices, they are continually re-broadcast until updated slices are available for transmission.

An embodiment uses broadcast mechanisms such as a television signal to transmit the slice. However, it is desirable to provide for download over a connection-based mechanism, such as a modem or Internet connection. Using a connection-based mechanism usually results in time-based usage fees, making it desirable to minimize the time spent transmitting the slice.

This is accomplished using a two-step process. When the connection is established, the client system sends an inventory of previously received slices to telephony servers 111. The server compares this inventory with the list of slices that should have been processed by that client. Slices which were not processed are transmitted to the client system.

3. The slice is transmitted by breaking the encrypted slice into a succession of short numbered data packets. These packets are captured by client systems and held in a staging area until all packets in the sequence are present. The packets are reassembled into the slice, which is then decrypted. The television viewing objects within the slice are then filtered for applicability, possibly being added to the local television viewing object database. This process replicates a portion of the central database of television viewing objects reliably into the client.

An embodiment keeps track of the time at which data packets are received. Data packets which are older than a selected time period are purged from the staging area on a periodic basis; this avoids consuming space for an indefinite period while waiting for all parts of a slice to be transmitted.

Especially when transmitting the objects over a broadcast medium, errors of various kinds may occur in the transmitted data. Each data packet is stamped with an error detecting code (a parity field or CRC code, for example). When an error is detected the data packet is simply discarded. The broadcast carousel will eventually retransmit the data packet, which is likely to be received properly. Slices of any size may thus be sent reliably; this is achieved at the cost of staging received portions of the object on the client until all portions are properly received.

4. There may be one or more "special" slices transmitted which communicate service related data to the client system, particularly service authorization information. It is important that the service provider be able to control the client system's access to premium services if the viewer has failed to pay his bill or for other operational reasons.

One particular type of special slice comprises an "authorization" object. Authorization objects are generally encrypted using asymmetric key encryption based on the public/private key pair associated with a specific client. If the slice can be successfully decrypted by the security microprocessor using the embedded private key, the slice will comprise an object indicating the allowable time delay before another authorization object is received, as well as one or more symmetric keys valid for a short time period. The delay value is used to reset a timestamp in the database indicating when the client system will stop providing services. The symmetric keys are stored in the local television viewing object database, to be used in decrypting new slices which may be received.

If the client has not received a proper authentication object by the time set in the database, it will commence denial of most services to the viewer (as specified by the service provider). Also comprised within an authentication object are one or more limited-lifetime download keys which are needed to decrypt the slices that are transmitted. Clearly, if a client system is unable to authenticate itself, it will not be able to decrypt any objects.

Each authorization slice is individually generated and transmitted. If broadcast transmission is used for the slices, all relevant authorizations are treated identically to all other slices and carouseled along with all other data. If direct transmission is used, such as via a phone connection, only the authentication slice for that client is transmitted.

5. Once the client device has received a complete database slice, it uses the methods described earlier to add the new object contained within it to the database.

Collecting Information from the Client Systems

Referring again to FIG. 1, in an embodiment the following steps constitute "collection" of television viewing objects from each client database:

1. As the viewer navigates the television channels available to him, the client system records interesting information, such as channel tuned to, time of tuning, duration of stay, VCR-like actions (e.g., pause, rewind), and other interesting information. This data is stored in a local television viewing object.

Additionally, the viewer may indicate interest in offers or promotions that are made available, or he may indicate a desire to purchase an item. This information is also recorded into a local television viewing object.

Additionally, operation of the client device may result in important data that should be recorded into a television viewing object. For example, errors may occur when reading from the hard disk drive in the client, or the internal temperature of the device may exceed operational parameters. Other similar types of information might be failure to properly download an object, running out of space for various disk-based operations, or rapid power cycling.

2. At a certain time, which may be immediate or on a periodic basis, the client system contacts the central site via a direct connection 104 (normally via phone and/or an Internet connection). The client device sends a byte sequence identifying itself which is encrypted with its secret key. The server fetches the matching television viewing object for the client device from the database, and uses the key stored there to decrypt the byte sequence. At the same time, the server sends a byte sequence to the client, encrypted in its secret key, giving the client a new one-time encryption key for the session.

Both sides must successfully decrypt their authentication message in order to communicate. This two-way handshake is important, since it assures both client and server that the other is valid. Such authentication may avoid various attacks that may occur on the client system. For example, if communications were not authenticated in such a fashion, a malicious party might create an "alias" central site with a corrupt television viewing object database and provide bad information to a client system, causing improper operation. All further communication is encrypted using the one-time session key. Encrypted communication may be desirable because the information may pass across a network, such as the Internet, where data traffic is open to inspection by all equipment it passes through. Viewing objects being collected may comprise information that is considered private, so this information should be fully protected at all times.

Assuming that the authentication phase is successful, the two parties treat the full-duplex phone line as two one-way broadcast channels. New slices are delivered to the client, and viewing data to be collected is sent back. The connection is ended when all data is delivered.

Such connection may take place over a network, such as the Internet running standard TCP/IP protocols, transparently to all other software in the system.

3. Uploaded information is handled similarly by the server; it is assumed to represent television viewing objects to be replicated into the central database. However, there may be many uploaded viewing objects, as there may be many clients of the service. Uploaded objects are therefore assigned a navigable attribute comprising information about their source; the object is then indexed uniquely into the database namespace when it is added.

Uploaded viewing objects are not immediately added to the central database; instead they are queued for later insertion into the database. This step allows the processing of the queue to be independent of the connection pattern of client devices. For instance, many devices may connect at once, generating a large number of objects. If these objects were immediately added to the central database, the performance of all connections would suffer, and the connection time would increase. Phone calls are charged by duration, thus any system in which connection time increases as a function of load is not acceptable.

Another advantage of this separation is that machine or network failures are easily tolerated. In addition, the speed at which viewing objects are processed and added to the central database may be controlled by the service provider by varying the computer systems and their configurations to meet cost or performance goals.

Yet another advantage of this separation is that it provides a mechanism for separating data collected to improve service operations and data which might identify an individual viewer. It is important that such identifying data be kept private, both for legal reasons and to increase the trust individuals have in the service. For instance, the navigable attribute assigned to a viewing object comprising the record of a viewer's viewing choices may comprise only the viewer's zip code, meaning that further processing of those objects can construct no path back to the individual identity.

Periodic tasks are invoked on the server to cull these objects from the database and dispose of them as appropriate. For example, objects indicating viewer behavior are aggregated into an overall viewer behavior model, and information that might identify an individual viewer is discarded. Objects comprising operational information are forwarded to an analysis task, which may cause customer service personnel to be alerted to potential problems. Objects comprising transactional information are forwarded to transaction or commerce systems for fulfillment.

Any of these activities may result in new television viewing objects being added to the central database, or in existing objects being updated. These objects will eventually be transmitted to client devices. Thus, the television viewing management system is closed loop, creating a self-maintaining replicated database system 105 which can support any number of client systems.

Processing of Television Viewing Objects by Client Systems

Television viewing objects may comprise the following types of information: television program descriptions and showing times; cable, satellite or broadcast signal originator information, such as channel numbering and identification; viewer preference information, such as actors, genre, showing times, etc.; software, such as enhanced database software, application software, operating system software, etc.; statistical modeling information such as preference vectors, demographic analysis, etc.; and any other arbitrary information that may be represented as digital data.

Methods Applied to Program Guide Objects

Program guide objects comprise information for software running in the client system to tune, receive, record and view programs of interest to the user of the client system, selecting from among all available programs and channels as described by objects within the database.

This program guide information is updated on a regular basis by a service provider. This is handled by the provider acquiring program guide information in some manner, for instance, from a commercial supplier of such information or other sources of broadcast schedule information. This data is then processed using well-understood software techniques to reduce the information to a collection of inter-related viewing objects.

Referring again to FIG. 4, a typical relationship between program guide objects is shown. A television "network" object 407 is any entity which schedules and broadcasts television programming, whether that broadcast occurs over the air, cable, satellite, or other suitable medium. A television "program" object 401 is a description of any distinct segment of a television broadcast signal, such as a particular program, commercial advertisement, station promotion, opener, trailer, or any other bounded portion of a television signal. A "showing" object 406 is a portion of the broadcast schedule for a network on which a program is broadcast. A "channel map" object maps a network broadcast onto a particular broadcast channel for the medium being used; for instance, a channel map object for a satellite broadcast service would include information about the transponder and data stream comprising the broadcast. Using the previously described methods, this program guide data is replicated from the central site to the client systems, where application software in the client systems use the data to manage television viewing.

The service provider may also provide aggregation viewing objects, which describe a set of program guide objects that are interrelated in some fashion. For instance, a "Star-Trek" collection might comprise references to all program guide objects associated with this brand name. Clearly, any arbitrary set of programs may be aggregated in this fashion. Aggregation objects are similar to directories. For instance, the Star Trek collection might be found at "/showcases/Star Trek" in the hierarchical namespace. Aggregation objects are also program guide objects, and may be manipulated in a similar fashion, including aggregating aggregation objects, and so forth.

The client system may further refine the collection of program objects. In a system where programming may be captured to internal storage, each captured program is represented by a new program guide object, becoming available for viewing, aggregation, etc. Explicit viewer actions may also result in creation of program guide objects. For instance, the viewer may select several programs and cause creation of a new aggregation object.

This description of types of program guide objects is not meant to be inclusive; there may be many different uses and ways of generating program guide objects not herein described which still benefit from the fundamental methods of an embodiment.

Program guide objects are used by the application software in five ways:

1. In the simplest case, the viewer may wish to browse these objects to discern current or soon-to-be-available programming. The application software will map the object relationships described by the database to some form of visual and audible interface that is convenient and useful for the viewer. The viewer may indicate that a particular program is of interest, resulting in some application-specific action, such as recording the program to local storage when it is broadcast.

2. Application software may also directly process program guide objects to choose programs that may be of interest to the viewer. This process is typically based on an analysis of previously watched programming combined with statistical models, resulting in a priority ordering of all programs available. The highest priority programs may be processed in an application specific manner, such as recording the program to local storage when it is broadcast. Portions of the priority ordering so developed may be presented to the viewer for additional selection as in case 1.

Some prior art exists that may be centered on methods for selecting programming for a viewer based on previous viewing history and explicit preferences, e.g., U.S. Pat. No. 5,758,257. The methods described in this application are unique and novel over these techniques as they suggest priorities for the capture of programming, not the broadcast or transmission of programming, and there is no time constraint on when the programming may be broadcast. Further details on these methods are given later in this description.

In general, explicit viewer choices of programming have the highest priority for capture, followed by programming chosen using the preference techniques described herein.

3. A client system will have a small number of inputs capable of receiving television broadcasts or accessing Web pages across a network such as an intranet or the Internet. A scheduling method is used to choose how each input is tuned, and what is done with the resulting captured television signal or Web page.

Figure 6:
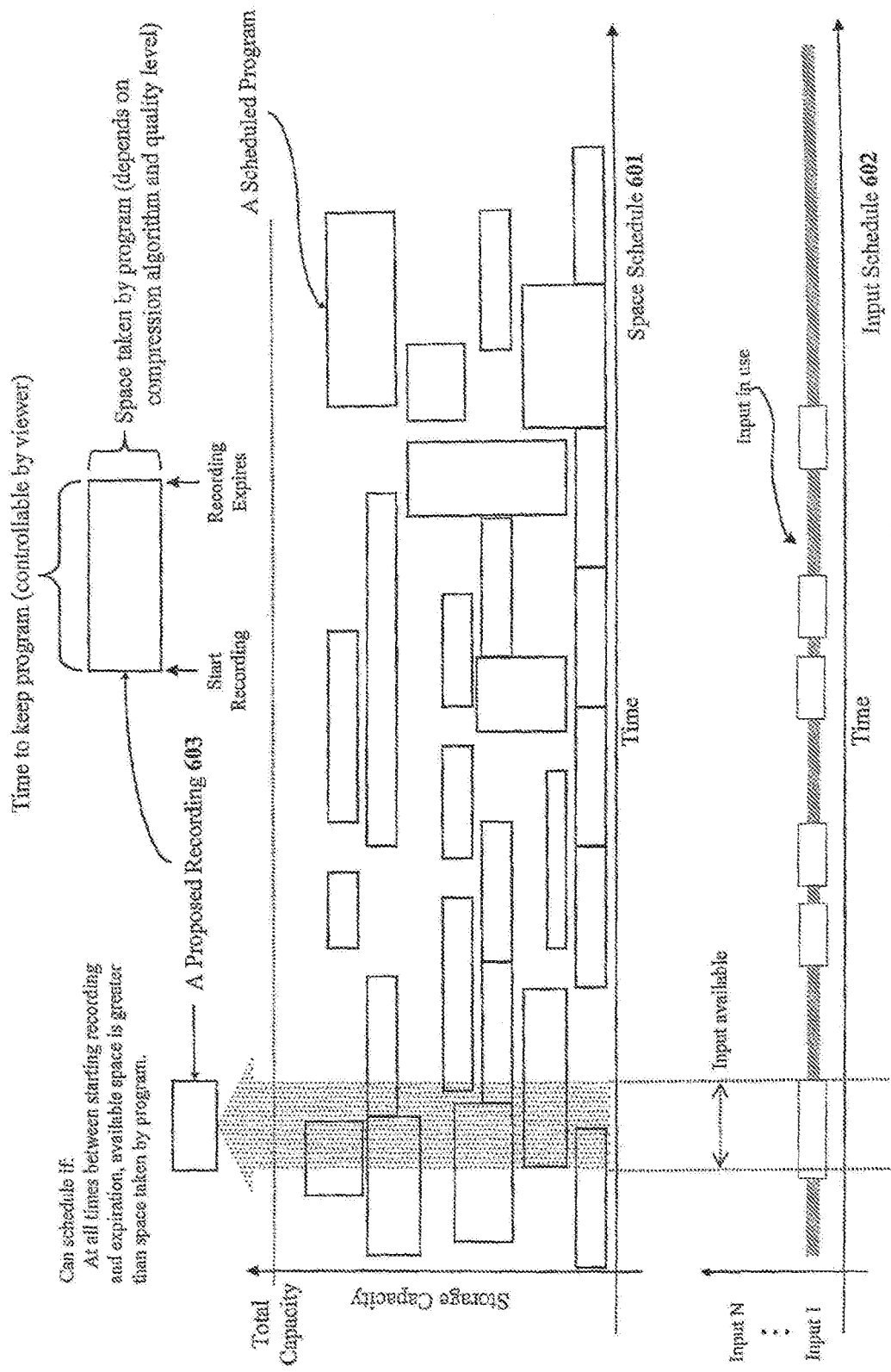
FIG. 6 is a block schematic diagram showing the scheduling of inputs and storage space for making recordings according to an embodiment.

Referring to FIG. 6, generally, the programs of interest to the viewer may be broadcast at any time, on any channel, as described by the program guide objects. Additionally, the programs of interest may be Web page Universal Resource Locators (URL) across a network, such as an intranet or the Internet. The channel metaphor is used to also describe the location, or URL, of a particular Web site or page.

A viewer, for example, can "tune" into a Web site by designating the Web site URL as a channel. Whenever that channel is selected, the Web site is displayed. A Web page may also be designated as a program of interest and a snapshot of the Web page will be taken and recorded at a predetermined time.

The scheduler accepts as input a prioritized list of program viewing preferences 603, possibly generated as per the cases above. The scheduling method 601 then compares this list with the database of program guide objects 604, which indicate when programs of interest are actually broadcast. It then generates a schedule of time 607 versus available storage space 606 that is optimal for the viewer's explicit or derived preferred programs. Further details on these methods are given later in this description.

4. When a captured program is viewed, the matching program guide object is used to provide additional information about the program, overlaid on the display using any suitable technique, preferably an On Screen Display (OSD) of some form. Such information may include, but is not limited to: program name; time, channel or network of original broadcast; expiration time; running time or other information.

5. When live programming is viewed, the application uses the current time, channel, and channel map to find the matching program guide object. Information from this object is displayed using any suitable technique as described above. The information may be displayed automatically when the viewer changes channels, when a new program begins, on resumption of the program after a commercial break, on demand by the viewer, or based on other conditions.

6. Using techniques similar to those described in case 2, application software may also capture promotional material that may be of interest to the viewer. This information may be presented on viewer demand, or it may be automatically inserted into the output television signal at some convenient point. For example, an advertisement in the broadcast program might be replaced by a different advertisement which has a higher preference priority. Using the time-warping apparatus, such as that described in U.S. Pat. No. 6,233,389, entitled "Multimedia Time Warping System", and owned by the Applicant, it is possible to insert any stored program into the output television signal at any point. The time-warping apparatus allows the overlaid program to be delayed while the stored program is inserted to make this work.

Methods for Generating a List of Preferred Programs

Viewer preferences may be obtained in a number of ways. The viewer may request that certain programs be captured, which results in the highest possible priority for those programs. Alternatively, the viewer may explicitly express preferences using appurtenances provided through the viewer interface, perhaps in response to a promotional spot for a particular program, or even during the viewing of a program. Finally, preferences may be inferred from viewing patterns: programs watched, commercial advertisements viewed or skipped, etc.

In each case, such preferences correspond to television viewing objects stored in the replicated database. Program objects included a wealth of information about each particular program, for example: title, description, director, producer, actors, rating, etc. These elements are stored as attributes attached to a program object.

Each individual attribute may result in the generation of a preference object. Such objects store the following information:
1. The type of the preference item, such as actor or director preference;
2. The weight of the preference given by the viewer, which might be indicated by multiple button presses or other means;
3. The statically assigned significance of the preference in relation to other preferences, for example, actor preference are more significant than director preferences;
4. The actual value of the preference item, for instance the name of the director.

Figure 5:
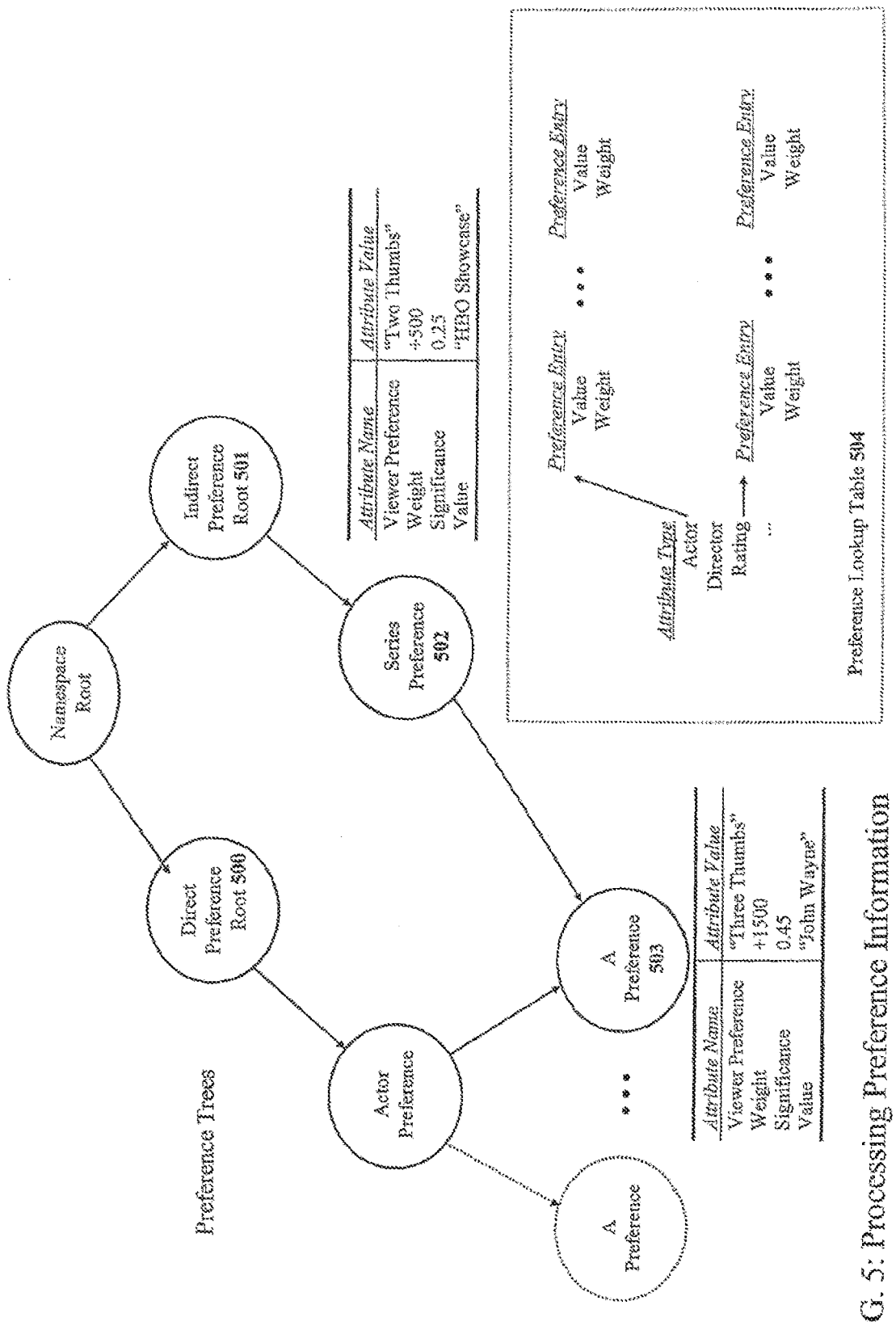
FIG. 5 is a block schematic diagram showing an example graph of relationships generated when processing viewer preferences to determine programs of interest according to an embodiment.

With respect to FIG. 5, preference objects are stored in the database as a hierarchy similar to that described for program guide objects, however this hierarchy is built incrementally as preferences are expressed 500. The hierarchy thus constructed is based on "direct" preferences, e.g., those derived from viewer actions or inferred preferences.

A similar hierarchy is developed based on "indirect" preferences pointing to the same preference objects 501. In general, indirect preferences are generated when preferences for aggregate objects are generated, and are used to further weight the direct preferences implied by the collection of aggregated objects. The preference objects referenced through the indirect preference hierarchy are generated or updated by enumerating the available program objects which are part of the aggregate object 502, and generating or updating preference objects for each attribute thus found.

The weight of a particular preference 503 begins at zero, and then a standard value is added based on the degree of preference expressed (perhaps by multiple button presses) or a standard value is subtracted if disinterest has been expressed. If a preference is expressed based on an aggregate viewing object, all preferences generated by all viewing objects subordinate to the aggregated object are similarly weighted. Therefore, a new weighting of relevant preference elements is generated from the previous weighting. This process is bounded by the degree of preference which is allowed to be expressed, thus all weightings fall into a bounded range.

In an embodiment, non-linear combinations may be used for weighting a preference item. For instance, using statistical models provided by the central site, the client may infer that a heavily weighted preference for three attributes in conjunction indicates that a fourth attribute should be heavily weighted as well.

The list of preferred programs is generated as follows:
1. A table 504 is constructed which lists each possible program object attribute, and any preference objects for that attribute that are present are listed in that entry.
2. If the preference item is a string, such as an actor name, a 32-bit digital signature for that string is computed using a 32-bit CRC algorithm and stored with the table item, rather than the string itself. This allows for much faster scanning of the table as string comparisons are avoided, at the slight risk of two different strings generating the same digital signature.
3. For each program object in the database, and for each attribute of that program, the attribute is looked up in the table. If present, the list of preference objects for that attribute is examined for a match with the attribute of the current program object. If a match occurs, the weight associated with that preference object is added to weighting associated with the program object to generate a single weight for the program.
4. Finally, the program objects are rank-ordered based on the overall weighting for each program, resulting in a list of most-preferred to least-preferred programs.

Given this final prioritized list, a recording schedule is generated using the methods described below, resulting in a collection of recorded programs of most interest to the viewer.

Methods Applied to Scheduling Recording Versus Available Storage Space

As has been described previously, recorded programs will in general have an expiration date, after which the recorded program is removed from client storage. The viewer may at any time indicate that a program should be saved longer, which delays expiration by a viewer-selected interval. An embodiment views the available storage for recording programs as a "cache"; unviewed programs are removed after a time, based on the assumption they will not be watched if not watched soon after recording. Viewed programs become immediate candidates for deletion, on the assumption they are no longer interesting.

With proper scheduling of recording and deletion of old programs, it is possible to make a smaller storage area appear to be much larger, as there is an ongoing flushing of old programs and addition of new programs. Additionally, if resources are available, recordings may be scheduled of programs based on inferred preferences of the viewer; these are called "fuzzy" recordings. This results in a system where the program storage area is always "full" of programming of interest to the viewer; no program is removed until another program is recorded in its place or the viewer explicitly deletes it.

Additionally, the viewer may select a program for recording at any time, and the recording window may conflict with other scheduled recordings, or there may not be sufficient space obtainable when the program is to be recorded. An embodiment includes unique and novel methods of resolving such conflicts.

Conflicts can arise for two reasons: lack of storage space, or lack of input sources. The television viewing system described herein includes a fixed number of input sources for recording video and a storage medium, such as a magnetic disk, of finite capacity for storing the recorded video. Recording all television programs broadcast over any significant period of time is not possible. Therefore, resolving the conflicts that arise because of resource limitations is the key to having the correct programs available for viewing.

Referring again to FIG. 6, an embodiment maintains two schedules, the Space Schedule 601 and the Input Schedule 602. The Space Schedule tracks all currently recorded programs and those which have been scheduled to be recorded in the future. The amount of space available at any given moment in time may be found by generating the sum of all occupied space (or space that will be occupied at that time) and subtracting that from the total capacity available to store programs. Programs scheduled for recording based on inferred preferences ("fuzzy" recordings) are not counted in this calculation; such programs automatically lose all conflict decisions.

A program may be recorded 603 if at all times between when the recording would be initiated and when it expires, sufficient space is available to hold it. In addition, for the duration of the program, there should be an input available from which to record it. The Input Schedule 602 tracks the free and occupied time slots for each input source. In an embodiment, the input sources may not be used for identical services, e.g., one input may be from a digital television signal and another from an analog television signal with different programming. In this case, only those inputs from which the desired program can be recorded are considered during scheduling.

Figure 7:
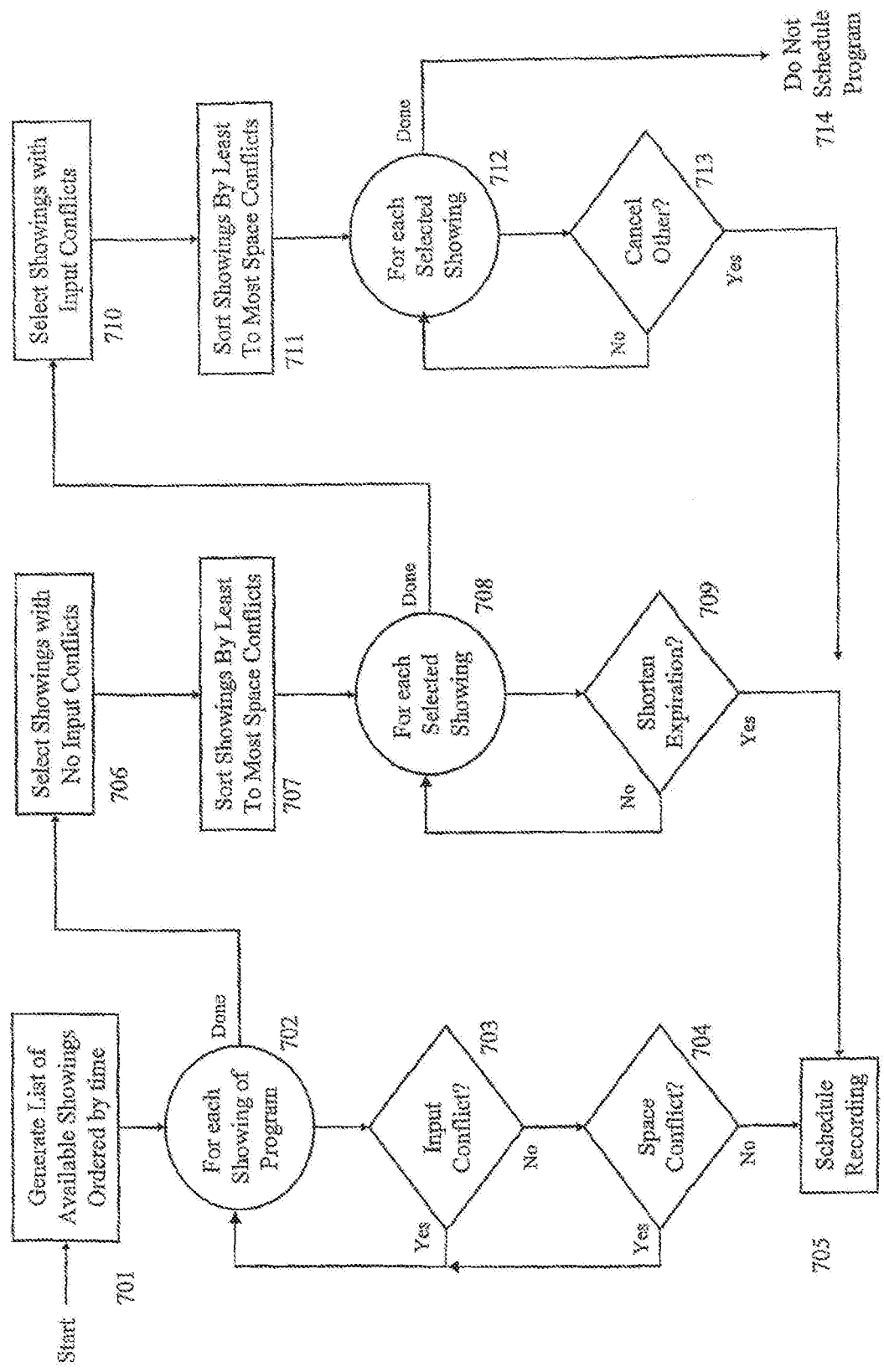
FIG. 7 is a flowchart showing the steps taken to schedule a recording using the mechanism depicted in FIG. 6 according to an embodiment.

With respect to FIG. 7, a flowchart is shown describing the steps taken to schedule a recording in an embodiment. First, an ordered list of showings of the program of interest are generated 701. Although an embodiment orders these showings by time, such that the recording is made as soon as possible, any particular ordering might be chosen. Each showing in this list 702 is then checked to see if input 703 or space 704 conflicts occur as described above. If a showing is found with no conflicts, then the program is scheduled for recording 705.

Otherwise, an embodiment selects only those showings of the program which have no input conflicts 706. Referring again to FIG. 6, one can see that over the lifetime of a recording the amount of available space will vary as other programs are recorded or expire. The list of showings is then sorted, preferably by the minimum amount of available space during the lifetime of the candidate recording. Other orderings may be chosen.

Referring again to FIG. 7, for each candidate showing, the viewer is presented with the option of shortening the expiration dates on conflicting programs 708, 709. This ordering results in the viewer being presented these choices in order from least impact on scheduled programs to greatest 707; there is no requirement of an embodiment that this ordering be used versus any other.

Should the viewer reject all opportunities to shorten expiration times, the final step involves selecting those showings with input conflicts 710, and sorting these showings as in the first conflict resolution phase 711. The viewer is then presented with the option to cancel each previously scheduled recording in favor of the desired program 712, 713. Of course, the viewer may ultimately decide that nothing new will be recorded 714.

In an embodiment, all conflicts are resolved as early as possible, giving the viewer more control over what is recorded. When the viewer makes an explicit selection of a program to record, the algorithm described in FIG. 7 is used to immediately schedule the recording and manage any conflicts that arise.

Once an explicit selection has been made, and the viewer informed that the recording will be done, it will not be canceled without explicit approval of the viewer.

Fuzzy recordings are periodically scheduled by a background task on the client device. Given the prioritized list of preferred programs as described earlier, the background scheduler attempts to schedule each preferred program in turn until the list is exhausted or no further opportunity to record is available. A preferred program is scheduled if and only if there are no conflicts with other scheduled programs. A preferred program which has been scheduled may be deleted under two conditions: first, if it conflicts with an explicit selection, and second, if a change in viewer preferences identifies a higher priority program that could be recorded at that time.

A further complication arises when handling aggregate viewing objects for which recording is requested. If conflict resolution was handled according to the method above for such objects, a potentially large number of conflicts might be generated, leading to a confusing and frustrating experience for the viewer in resolving the conflicts. Thus, when aggregate objects are chosen for recording, conflicts are automatically resolved in favor of the existing schedule.

In an embodiment, conflicts resulting from the recording of aggregate objects will be resolved using the preference weighting of the programs involved; if multiple conflicts are caused by a particular program in the aggregate object, it will only be recorded if its preference exceeds that of all conflicting programs.

Methods Applied to Software Objects

The client system requires a complex software environment for proper operation. An operating system manages the interaction between hardware devices in the client and software applications which manipulate those devices. The television viewing object database is managed by a distinct software application. The time-warping software application is yet another application.

It is desirable to add new features or correct defects in these and other software subsystems which run on the client hardware device. Using the methods described herein, it is possible to replicate viewing objects comprising updated software modules into the client system database. Once present in the client system database, the following unique and novel methods are used to install the updated software and cause the client system to begin executing the new software.

The software environment of the device is instantiated as a sequence of steps that occur when power is first applied to the device, each step building up state information which supports proper application of the following step. The last step launches the applications which manage the device and interact with the viewer. These steps are:

1. A read-only or electrically programmable memory in the device holds an initial bootstrap sequence of instructions. These instructions initialize low-level parameters of the client device, initialize the disk storage system, and load a bootstrap loader from the disk into memory, to which execution is then passed. This initial bootstrap may be changed if it resides in an electrically programmable memory.

2. The second stage boot loader then locates the operating system on the disk drive, loads the operating system into memory, and passes execution to the operating system. This loader exists at a specific location on the disk so as to be easily located by the initial loader.

The operating system performs certain hardware and software initialization. It then loads the viewing object database software from the disk drive, and begins execution of the application. Other application software, such as the time-warping software and viewer interaction software, are also loaded and started. This software is usually located in a separate area on the disk from the object database or captured television programs.

Ideally, new software would be installed by simply copying it to the appropriate place on the disk drive and rebooting the device. This operation is fraught with danger, especially in a home environment. Power may fail while copying the software, resulting in an inconsistent software image and potential operating problems. The new software may have defects which prevent proper operation. A failure may occur on the disk drive, corrupting the software image.

Although the methods of this invention have referred to a disk drive, such methods described here apply generally to any persistent storage system. A disk drive and other persistent storage systems are typically formatted into a sequence of fixed-size blocks, called sectors. "Partitions" are sequential, non-overlapping subsets of this sequence which break up the storage into logically independent areas.

Figure 8:
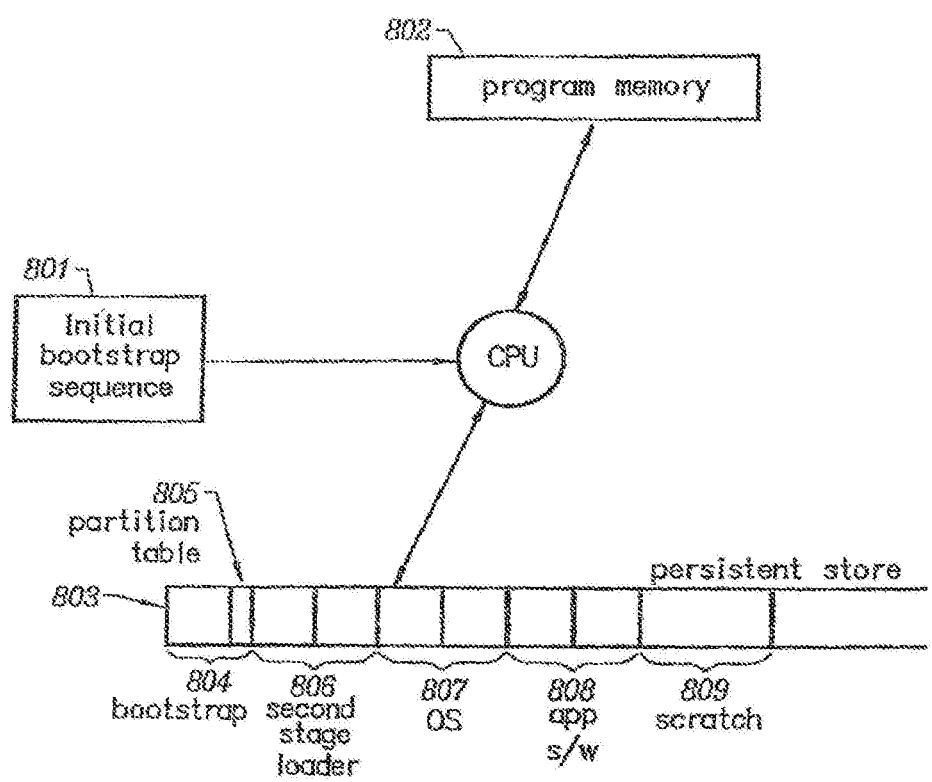
FIG. 8 is a block schematic diagram showing the bootstrap system configuration according to an embodiment.

With respect to FIG. 8, an embodiment maintains a sector of information at a fixed location on the disk drive 803 called the "boot sector" 804. The boot sector 804 comprises sufficient information for the initial bootstrap 801 to understand the partitioning of the drive 803, and to locate the second stage boot loader 806.

The disk is partitioned into at least seven (7) partitions. There are two (2) small partitions dedicated to holding a copy of the second stage boot loader 806, two (2) partitions holding a copy of the operating system kernel 807, two (2) partitions comprising a copy of the application software 808, and a partition to be used as scratch memory 809. For duplicated partitions, an indication is recorded in the boot sector 805 in which one of the partitions is marked "primary", and the second is marked "backup".

Although two partitions are described herein for redundancy, triple, quadruple or greater degrees of redundancy may be achieved by creating more duplicated partitions.

Figure 9A:
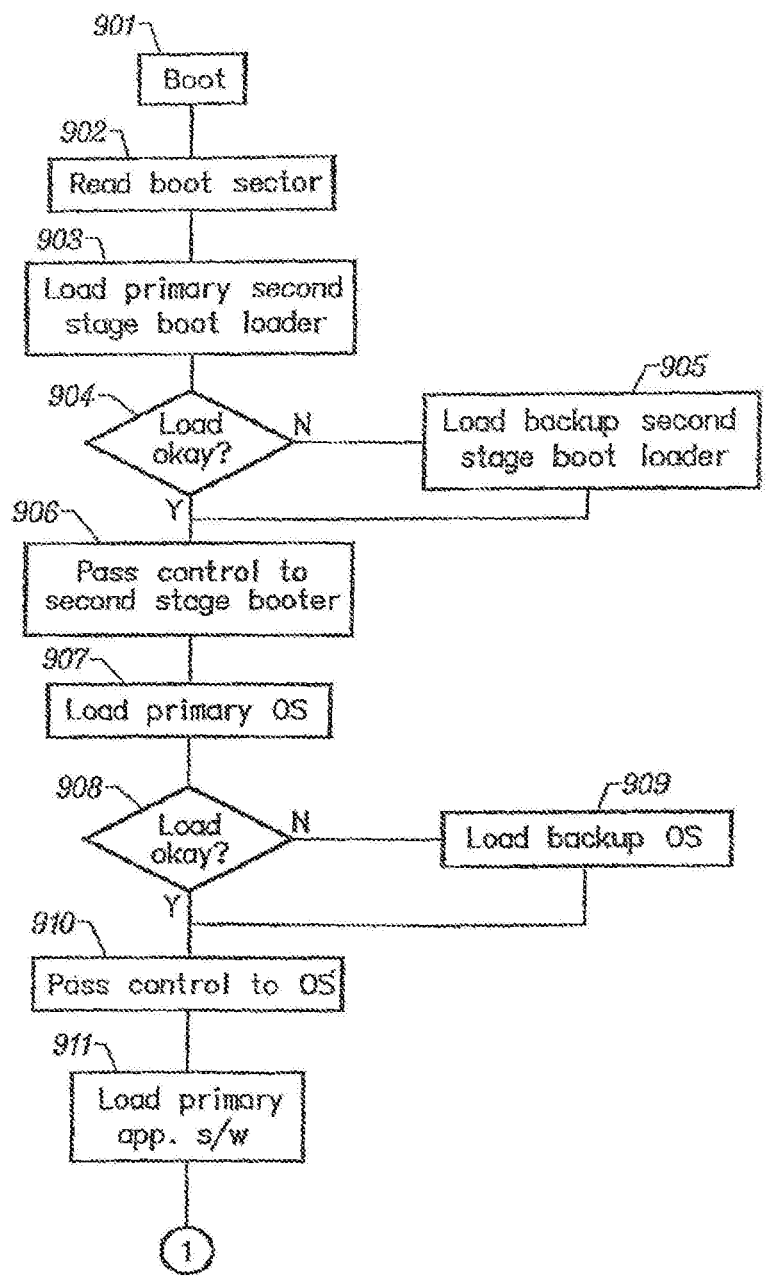
FIG. 9A is a block schematic diagram of the decision flowchart for the bootstrap component according to an embodiment.
Figure 9B:
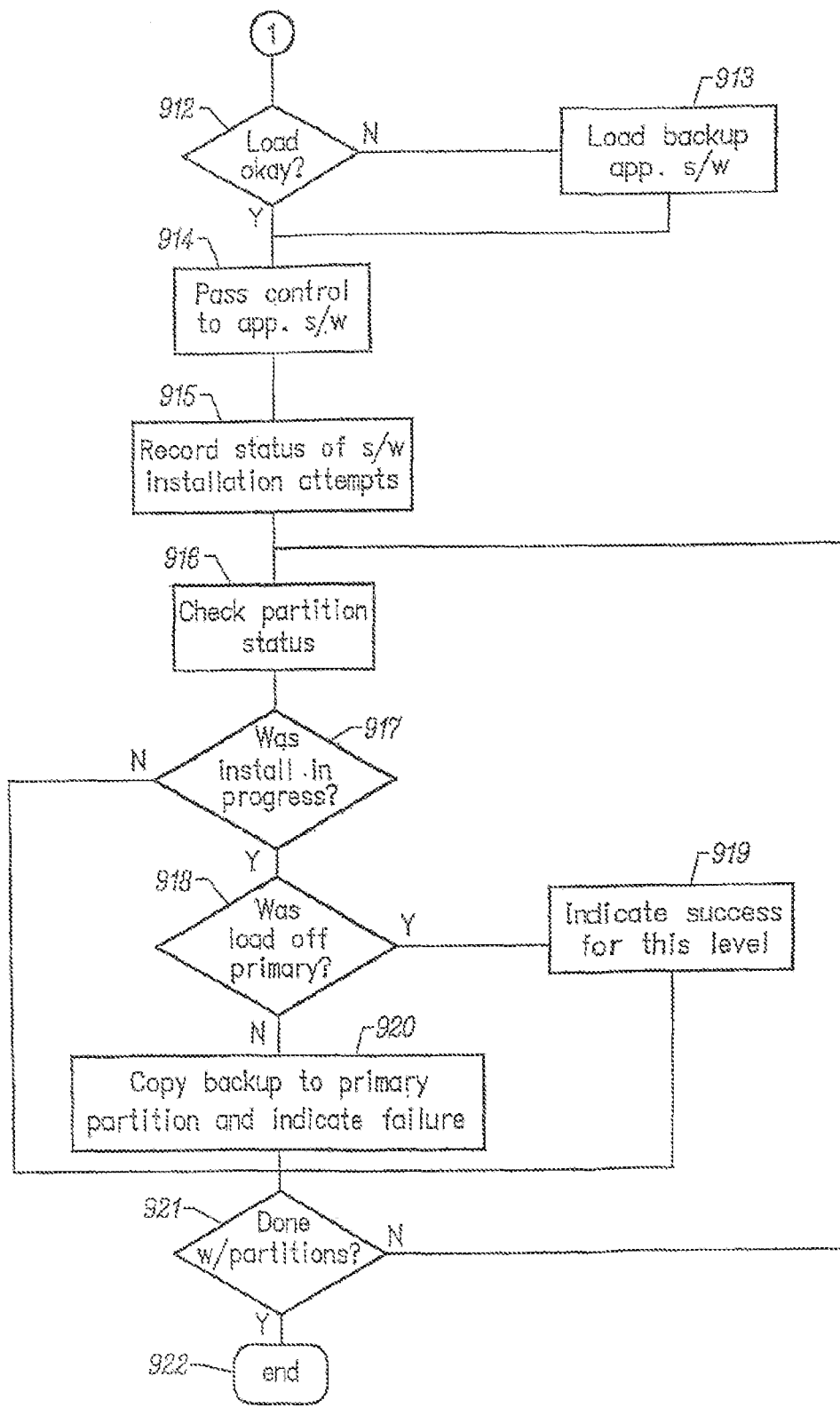
FIG. 9B is a block schematic diagram of the decision flowchart for the bootstrap component according to an embodiment.

With respect to FIGS. 9A and 9B, on boot 901, the initial bootstrap code reads the boot sector 902, scans the partition table and locates the "primary" partition for the second stage boot loader. It then attempts to load this program into memory 903. If it fails 904, for instance, due to a failure of the disk drive, the boot loader attempts to load the program in the "backup" partition into memory 905. Whichever attempt succeeds, the boot loader then passes control to the newly loaded program, along with an indication of which partition the program was loaded from 906.

Similarly, the second stage boot loader reads the partition table and locates the "primary" operating system kernel 907. If the kernel can not be loaded 908, the "backup" kernel is loaded instead 909. In any case, control is passed to the operating system along with an indication of the source partition, along with the passed source partition from above 910.

Finally, the operating system locates the "primary" partition comprising application software and attempts to load the initial application 911. If this fails 912, then the operating system locates the "backup" partition and loads the initial application from it 913. An indication of the source partition is passed to the initial application, along with the source partition information from the previous steps. At this point, application software takes over the client system and normal viewing management behavior begins 914.

This sequence of operations provides a reasonable level of protection from disk access errors. It also allows for a method which enables new software at any of these levels to be installed and reliably brought into operation.

An "installer" viewing object in the object database is used to record the status of software installation attempts. It records the state of the partitions for each of the three levels above, including an indication that an attempt to install new software is underway 915. This operation is reliable due to the transactional nature of the database.

Figure 10:
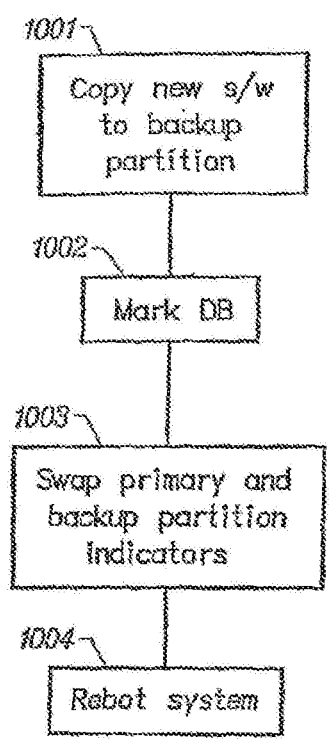
FIG. 10 is a block schematic diagram of the decision flowchart for the software installation procedure according to an embodiment.

Referring to FIG. 10, installing a new software image at any of the three levels is handled as follows: the new software image is first copied into the appropriate backup partition 1001, and an indication is made in the database that a software installation is underway 1002. The primary and backup partition indications in the partition table are then swapped 1003, and the system rebooted 1004. Eventually, control will be passed to the initial application.

Referring again to FIG. 9B, the first task of this application is to update the installer object. For each level 921, 922, the application checks if an installation was in process 916, 917, and verifies that the level was loaded off of the primary partition 918. If so, the installation at that level was successful, and the installer object is updated to indicate success for that level 919. Otherwise, the application copies the backup partition for that level over the primary partition and indicates failure in the installer object for that level 920. Copying the partition insures that a backup copy of known good software for a level is kept available at all times.

In an embodiment, finalization of the installation for the top application level of software may be delayed until all parts of the application environment have been successfully loaded and started. This provides an additional level of assurance that all parts of the application environment are working properly before permanently switching to the new software.

Methods Applied to Operations Status Objects

Operations status objects are a class of viewing object in which information about the usage, performance and behavior of the client system is recorded. These objects are collected by the central site whenever communication with the central site is established.

The following operations status indicators are recorded for later collection along with a time stamp:

1. Viewer actions, primarily pressing buttons on a remote control device, are recorded. Each "button press" is recorded along with the current time, and any other contextual information, such as the current viewer context. Post-processing of this object at the central site results in a complete trace of viewer actions, including the context in which each action is taken.
2. Automatic actions, such as beginning or ending the recording of a program, or choosing a program to record based on viewer preferences, are recorded. In addition, deletion of captured programs is recorded. Post-processing of this object at the central site results in a complete trace of program capture actions taken by the client system, including the programs residing in the persistent store at any point in time.
3. Software installation actions, including reception, installation, and post-reboot results are recorded.
4. Hardware exceptions of various kinds, including but not limited to: power fail/restart, internal temperature profile of the device, persistent storage access errors, memory parity errors and primary partition failures.

Since all actions are recorded along with a time stamp, it is possible to reconstruct the behavior of the client system using a linear time-based ordering. This allows manual or automatic methods to operate on the ordered list of events to correlate actions and behaviors. For instance, if an expected automatic action does not occur soon after rebooting with new software, it may be inferred that the new software was defective.

Processing of Television Viewing Objects by
Central Site Systems

Sources of Television Viewing Objects

A client system has a single source of television viewing objects: the central site. The central site object database has many sources of television viewing objects:

1. Program guide information obtained from outside sources is processed to produce a consistent set of program guide objects, indicating "programs", "showings", "channels", "networks" and other related objects. This set of objects will have dependencies ("channels" depend on "networks", "showings" depend on "programs") and other interrelationships. When a complete, consistent set of objects is ready, it is added to the database as an atomic operation.
2. New software, including new applications or revisions of existing software, are first packaged into "software" viewing objects. As above, the software may have interdependencies, such as an application depending on a dynamically loaded library, which is reflected in the interrelationships of the software objects involved. In another example, there may be two types of client systems in use, each of which requires different software objects; these software objects have attributes present indicating the type of system they are targeted at. Once a consistent set of objects is available, it is added to the database as an atomic operation.
3. Each client system has a unique, secret key embedded within it. The public key matching this secret key is loaded into a "client" management object, along with other interesting information about the client, such as client type, amount of storage in the system, etc. Such objects may be used to generate authentication objects.
4. Aggregation program guide objects are added in a similar fashion. In this case, however, the aggregation object refers to primitive program guide objects already present in the database. Also attached to the aggregation object are other objects, such as a textual description, a screen-based icon, and other informational attributes. Once a consistent set of ancillary objects to the aggregation is available, it is added to the database as an atomic operation.
5. Data collected from client systems.

It should be clear that there may be any number of sources of viewing objects, and this enumeration simply shows the most basic possible sources.

Operations on Television Viewing Objects

There are a large number of possible operations on the central television viewing object database. The following examples are meant to show the type of processing that may be performed, however the potential operations are not limited to these examples:

1. Using various viewing objects, a number of interesting statistical analysis tasks may be performed:
  1.1 By examining large numbers of uploaded operations status objects, it is possible to perform extensive analysis of hardware reliability trends and failure modes. For instance, it is possible to correlate internal temperature with expected MTBF (Mean Time between Failures) of client devices.
  1.2 By examining large numbers of uploaded viewing information, it is possible to derive demographic or psychographic information about various populations of client devices. For example, it is possible to correlate TV programs most watched within specific zip codes in which the client devices reside.
  1.3 Similarly, by examining large numbers of viewing information objects, it is possible to generate "rating" and "share" values for particular programs with fully automated methods, unlike existing program rating methods.
  1.4 There are many other examples of statistical analysis tasks that might be performed on the viewing object database; these examples are not meant to limit the applicability of an embodiment, but to illustrate by example the spectrum of operations that might be performed.
2. Specialty aggregation objects may be automatically generated based on one or more attributes of all available viewing objects.

Such generation is typically performed by first extracting information of interest from each viewing object, such as program description, actor, director, etc., and constructing a simple table of programs and attributes. An aggregate viewing object is then generated by choosing one or more attributes, and adding to the aggregate those programs for which the chosen attributes match in some way.

These objects are then included in the slices generated for transmission, possibly based on geographic or other information. Some example aggregates that might be created are:
  2.1 Aggregates based on events, such as a major league football game in a large city. In this case, all programs viewable by client devices in or around that city are collected, and the program description searched for the names of the teams playing, coaches names, major player's names, the name of the ballpark, etc. Matching program objects are added to the aggregate, which is then sliced for transmission only to client devices in regions in and around the city.
  2.2 Aggregates based on persons of common interest to a large number of viewers. For instance, an aggregate might be constructed of all "John Wayne" movies to be broadcast in the next week.
  2.3 Aggregates based on viewing behavior can be produced. In this case, uploaded viewing objects are scanned for elements of common interest, such as types of programs viewed, actual programs viewed, etc. For example, a "top ten list" aggregate of programs viewed on all client devices in the last week might be generated comprising the following week's showing of those programs.
  2.4 Aggregates based on explicit selections by viewers. During viewing of a program, the viewer might be presented with an opportunity to "vote" on the current program, perhaps on the basis of four perceived attributes (storyline, acting, directing, cinematography), which generates viewing objects that are uploaded later. These votes are then scanned to determine an overall rating of the program, which is transmitted to those who voted for their perusal.
  2.5 There are many other examples of how the basic facilities of this invention allow the service operator to provide pre-sorted and pre-selected groups of related programs to the user of the client device for perusal and selection. These examples are not meant to limit the applicability of an embodiment, but to illustrate by example the spectrum of operations that might be performed.
3. Manual methods may also be used to generate aggregate objects, a process sometimes called "authoring". In this case, the person creating the aggregate chooses programs for explicit addition to the aggregate. It is then transmitted in the same manner as above.

Clearly, aggregation program objects may also permit the expression of preferences or recording of other information. These results may be uploaded to the central site to form a basis for the next round of aggregate generation or statistical analysis, and so on.

This feedback loop closes the circuit between service provider and the universe of viewers using the client device. This unique and novel approach provides a new form of television viewing by providing unique and compelling ways for the service provider to present and promote the viewing of television programs of interest to individuals while maintaining reliable and consistent operation of the service.

Measuring Audience Activities and Behaviors Using Operations Status Objects

The client system records information relating to the viewer's viewing habit and behaviors and places this information into operations status objects. The client system uploads this information to the server. Operations status objects are collected by the server and processed. Viewer related information is sorted and placed in a relational database the central database. The following describes an example of the types of viewer information is derived from the viewer information:

What programs (or portions of programs) are recorded or viewed.
What programs plan to be recorded (predictive).
What programs are time-shifted and by how much.
How Trickplay features (e.g., variable rate fast forward and rewind, frame step, index, pause, variable rate reverse play, variable rate play, and play) are used.
Thumbs (user preference) ratings of programs.
Navigation through the interface.
Reactions to interactive content (e.g., iPreview—as described in U.S. patent application Ser. No. 09/665,921, entitled "Closed Caption Tagging System" owned by the Applicant).
Reactions to any other 'tagged' content (as described in U.S. patent application Ser. No. 09/665,921).

The server parses the accumulated viewer information object files to provide additional meaning and clarity to the data. For example, when the server observes Trickplay buttons being used on the client system's remote control, the server can infer the actual Trickplay state of the client system and record that in the relational database instead. If the server observes four presses of the fast-forward button, it recognizes that the viewer started to fast forward, then increased the speed of travel twice, and then resumed playback.

The server can also track use of the Play button on the remote control differently, depending upon context, e.g., "play following fast forward" is recorded differently than a "play following a pause".

Further, the server can infer the occurrence of events that are not themselves recorded in the viewer information. For instance, when a viewer changes channels to a new program, the server automatically determines and records the exact point where the first program was abandoned.

Each client system logs exactly which programs it has scheduled to record over a two-week period. By analyzing these records, the server can predict viewing activity and program ratings.

Using technology related to iPreview, invisible "stealth tags" can be inserted into a television broadcast signal's VBI, alongside any close caption information. The client system recognizes these tags and logs events when they are observed. These tags can be used to highlight or label events in program material where it is not known where the exact place and time of an segment of interest, e.g., the repeated airings of a specific commercial. Using two tags—one at the start and one at the end of a segment of interest—makes certain analyses much easier to perform.

The server can index the level of interest and attention a viewer base feels for a specific period of program content with a "Transit chart" described below. All observed viewer sessions that intersect the program content of interest are aggregated and the size and average speed of transit through the content are reported. For example, transit is reported as an index factor, where "1.0" represents viewing the spot at normal speed "2.0" is double speed and "0.5" is one-half speed. The program content to study can be identified by time and channel ("KTVU last Tuesday between 1 AM and 1:01 AM") or by program and position ("Episode 107 of M*A*S*H, from 17:00 min to 17:30 min") or through the use of stealth tags ("All airings of Coke ad #AB892, padded by 10 sec at either end").

The server can also chart subscriber behavior in relation to a specific broadcast. For a given episode, it can chart where viewers started or stopped viewing the program. It can chart where the FF, Pause or any Trickplay feature is used. For a sufficiently large number of observations, the response chart aggregates individual events into an overall picture of average behavior. As the number of events that can be charted against the broadcast is large, it makes sense to create several response charts which display limited, related events. These can include:

Fast forward—each of the three speeds available, and the Play event that follows any fast forward.
Rewind—each of the three speeds available, and the Play event that follows any rewind.
Thumbs—The exact moments when thumbs-up or thumbs-down buttons were pressed
Bail—The exact moments in the program where viewing begins (or resumes), and the exact moments in the program when the viewer chooses to leave.
Pause—The points in a program where the Pause button is pressed, or Slow Motion or Frame Advance are used.

The response chart can be made for an entire episode or focus on a specific segment of the broadcast, e.g., the first commercial pod. Stealth tags can be utilized to automatically highlight specific content on a response chart. Each response chart has a resolution which is the minimum period of time that is reported, e.g., one to ten second values work well.

Figure 11:
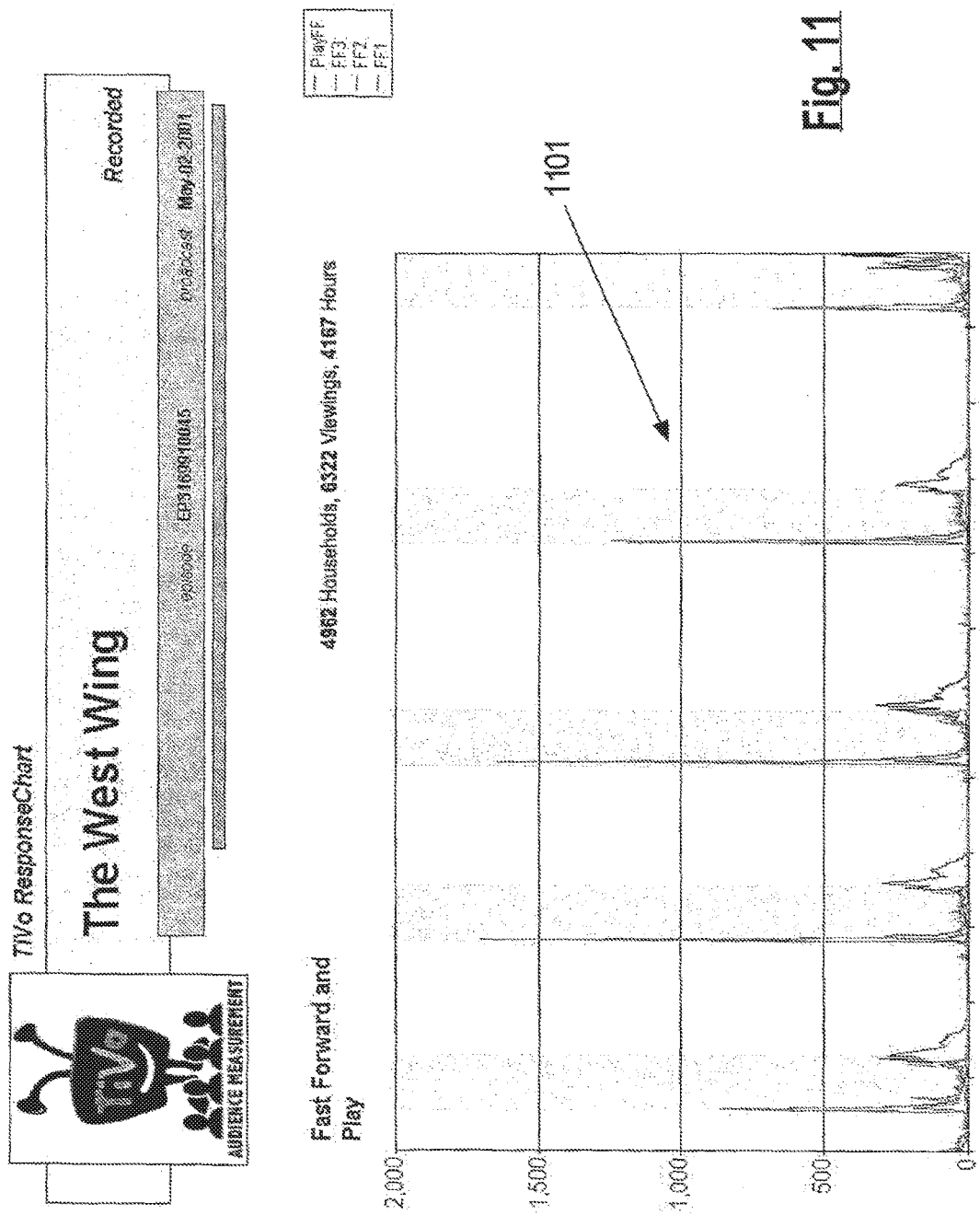
FIG. 11 is a schematic diagram of a Response Chart charting all use of trickplay features against position within an episode according to an embodiment.

With respect to FIG. 11, by charting all use of trickplay features against position within an episode using a Response Chart 1101, the server is able to chart the audience's response to specific content within the episode. The resolution of such a chart can be anything down to one second (five seconds is shown here).

Related Trickplay events can be charted together—in this case three different speeds of fast forward, and the occurrence of a "play" that follows some fast forward. The server distinguishes events by their context and therefore recognizes a "play" following a fast-forward is different from a "play" that follows a pause. This example 1101 clearly indicates the presence of commercial pods within the program.

Other interesting Response Charts include: use of "Thumbs Up" and "Thumbs Down" buttons within the program; use of slow-motion, instant replay, pause, and frame advance within a program; and the points where the audience tunes in or tunes away from the program.

Figure 12:
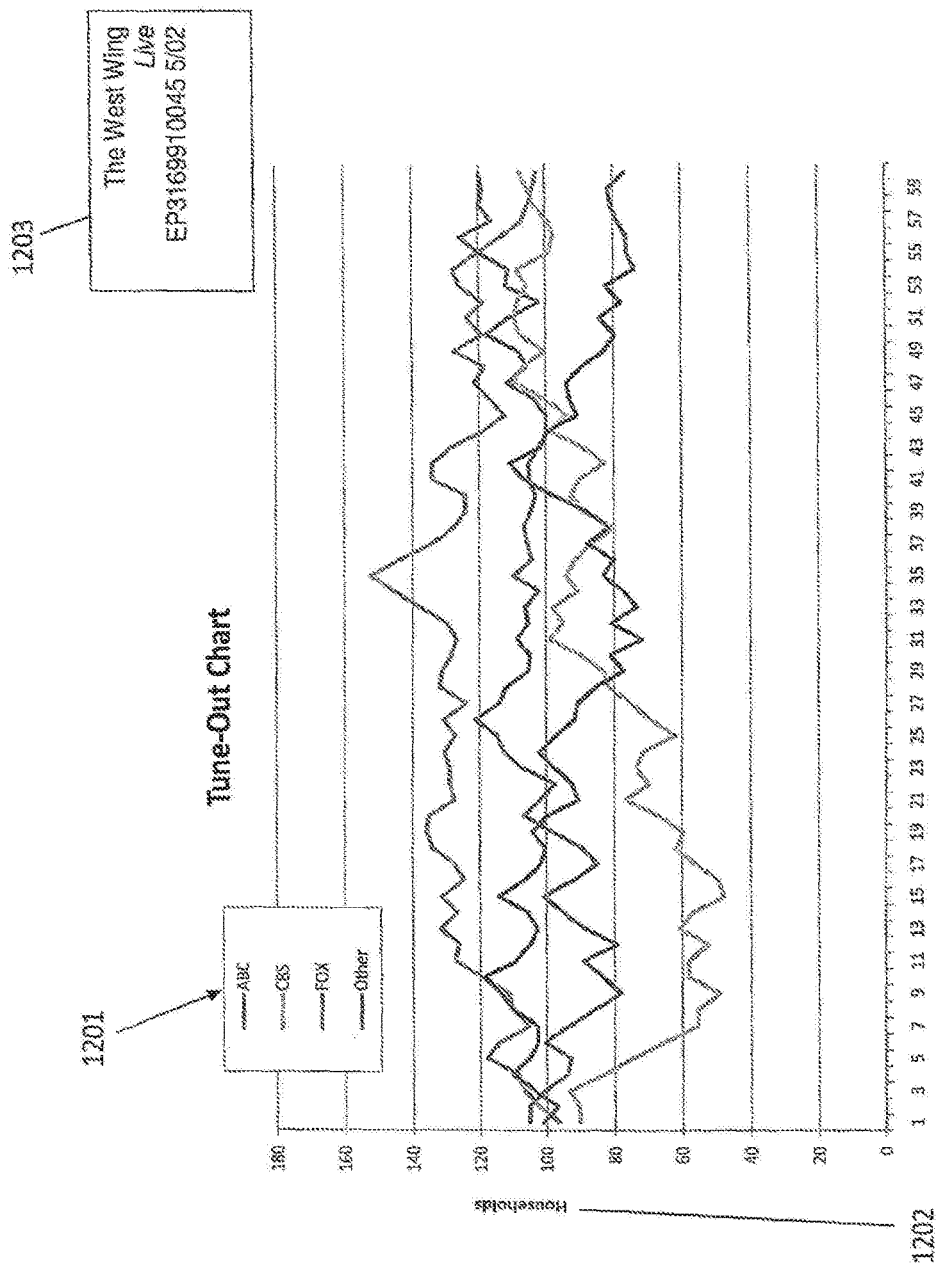
FIG. 12 is a schematic diagram of a Tune-Out chart showing the number of households that tune away from a specific program according to an embodiment.

Referring to FIG. 12, while the Response Chart can indicate exactly where within a specific program viewers will enter or leave a program, a Flow Report (Tune-Out Chart) 1201 can provide insight into where the viewers come from or go to. This example illustrates how a "Tune-Out" chart 1201 can show the number of households 1202 that tune away from a specific program 1203. The chart 1201 also provides insight into what point of the program they are at when they decide to tune and what their destination is. This would be combined with a "Tune-In" chart to provide a complete picture of viewer traffic around a specific program or block of airtime.

This chart 1201 can also have a resolution down to one second. While the tuning destinations shown in the example are networks, any level of actual detail is possible, including specific broadcast or recorded programs.

Figure 13:
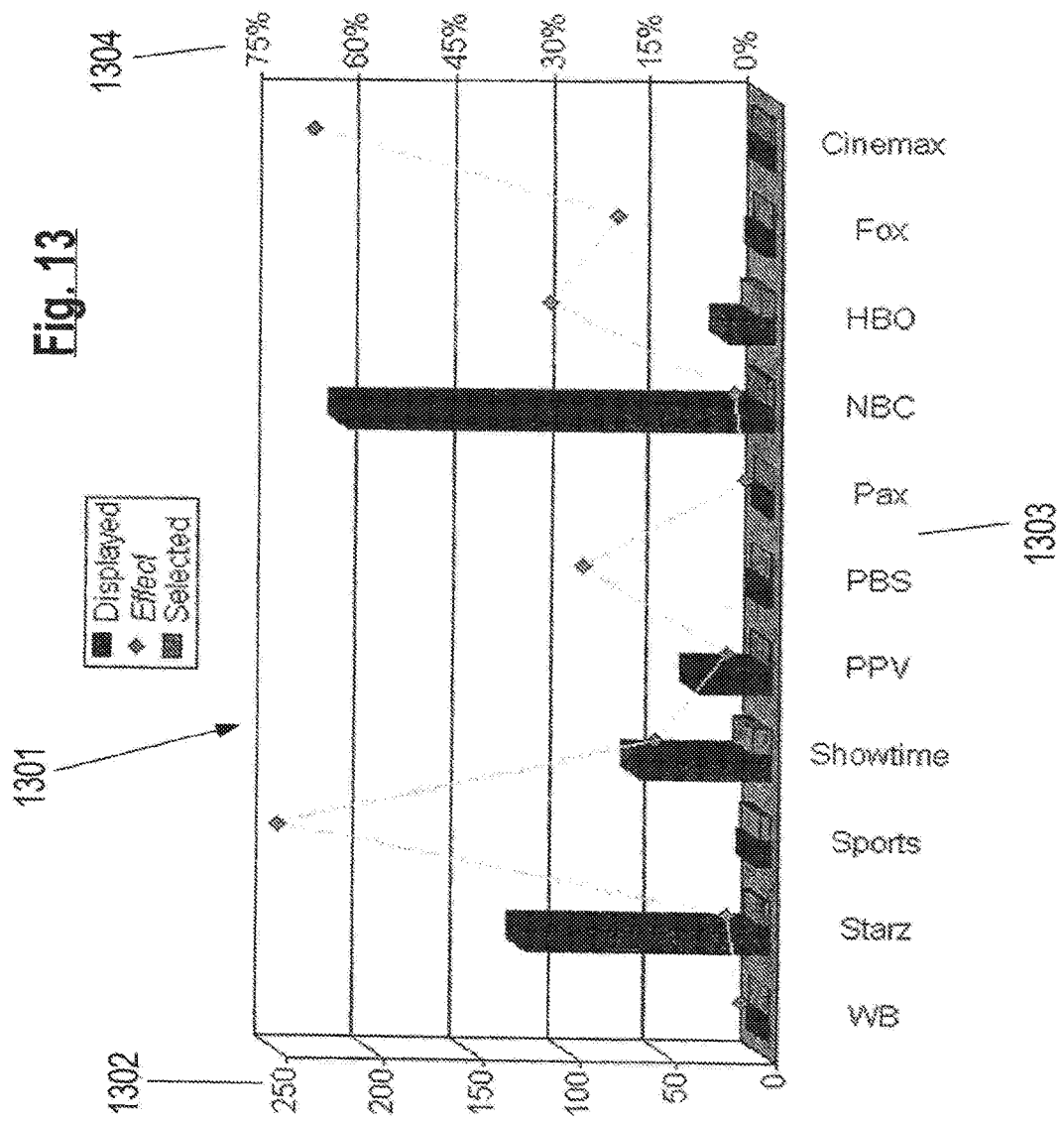
FIG. 13 is a schematic diagram of a chart that describes how an audience interacts with iPreview tags according to an embodiment.

With respect to FIG. 13, the server can fashion a number of reports that describe how an audience interacts with iPreview tags. The client can observe tags being displayed and selected, and report on any recordings or season passes that are created as a result of an iPreview tag. The server creates an iPreview effectiveness chart 1301. It indicates the number of times 1302 tags were displayed on each type of channel 1303 and how often those tags were selected 1304. The ratio is a measure of tag effectiveness. This is an "uncorrected" chart 1301, because it does not yet consider cases where the promoted program already has a recording scheduled in the home—in such cases there is no reason to react to the iPreview tag.

Figure 14:
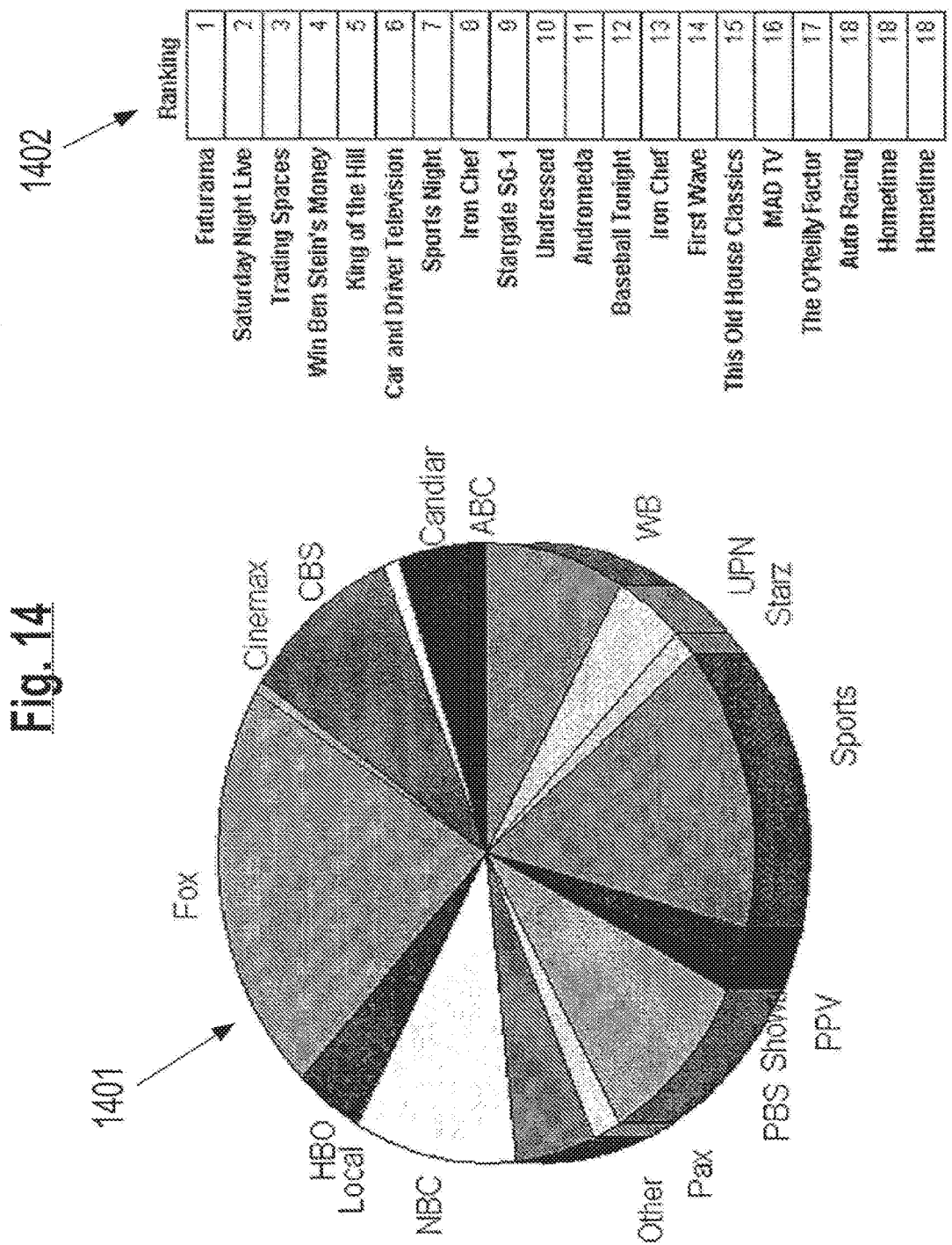
FIG. 14 is a schematic diagram of a chart that shows predictions of what programs will be recorded during a certain time period according to an embodiment.

Referring to FIG. 14, each client system maintains a schedule of all recordings it plans to make in the next two weeks as a "To Do list". Utilizing this information, the server is able to predict what programs will be recorded at any time within the next two weeks. This example shows the prediction for an entire Sunday 1401, 1402. That prediction can easily be focused into a specific daypart or segment of airtime. The server can also utilize the To Do lists to predict program viewings, and even to predict Nielsen ratings results.

With respect to FIG. 15, program recordings or viewings can be easily charted against geography of the household, day of the week, daypart, program genre, etc. 1501. The number of recordings made in each daypart is shown 1502 this is a count of shows recorded by client systems. This chart 1501 shows the total number of recordings categorized by the daypart during which the recording was made. The server's reporting tools would allow any segments of the chart to be "drilled down" into additional detail—such as program genre. It can also differentiate between recordings that are made as a result a Season Pass, Wish List, iPreview tag interaction, or a user-scheduled event.

Referring to FIG. 16, client systems make it easier than ever for households to timeshift their television viewing, deferring viewing until it is convenient or viewing a complete program over a number of disconnected sessions. Timeshifting Reports 1601 provide insight into what kind of programs are likely to be timeshifted, and by how much.

This chart 1601 shows the average amount of timeshifting 1602 for all programs by the daypart 1603 in which they originally aired. Again, it is possible to view this data by day of the week, program genre, household geography, or any combination. The server's reporting tools allow drilling down to specific segments to provide additional detail and understanding.

With respect to FIGS. 17A, 17B, and 17C, the server can report the amount of live broadcasts that are being viewed vs. timeshifted recordings and can additionally chart this against attributes such as day of the week, geography, daypart or genre 1701, 1702, 1703, 1704, 1705, 1706. Other related measures that are interesting include the number of distinct viewing sessions, and the average length of viewing sessions. For example, FIG. 17A illustrates an embodiment showing the ratio of a Sports genre 1701 where 31% of viewership is live and 69% of the viewership use timeshifted recordings. Additionally, in the Awards genre 1702, the live vs. timeshifted recording viewership is 41% and 59% respectively. Similar embodiments are found in FIGS. 17B and 17C which are illustrations of the ratio of live vs. timeshifted recording viewership for the genres including Children 1703, Comedy 1704, Documentary 1705, and Drama 1706.

DVR Synchronization Overview

Figure 18A:
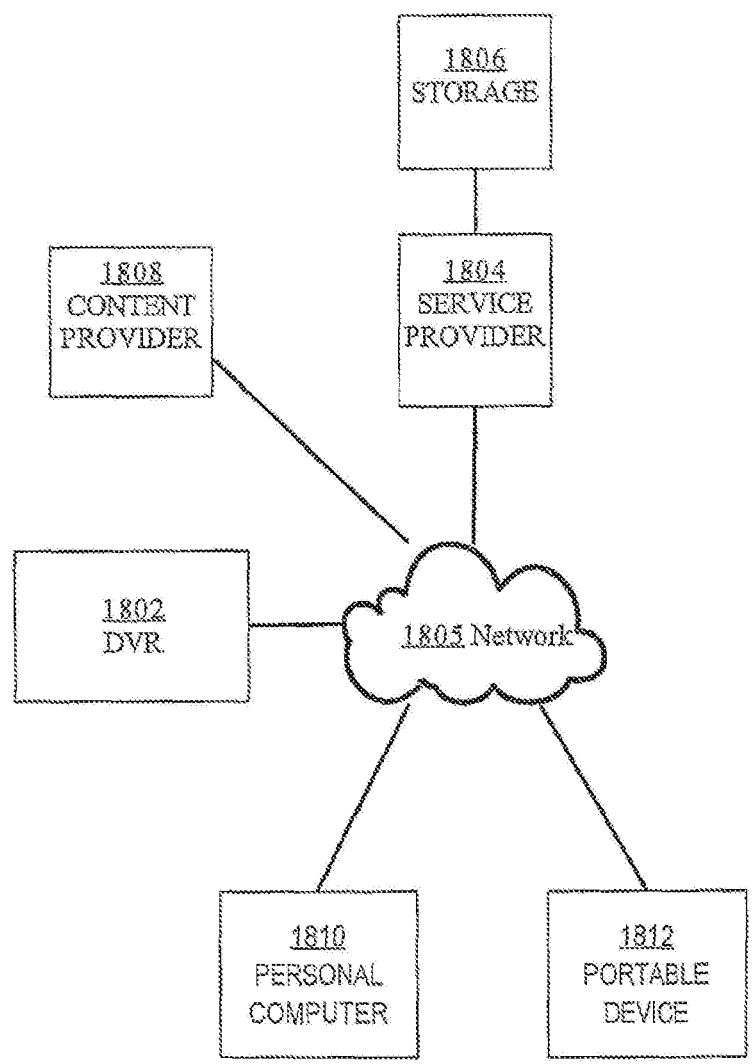
FIG. 18A is a block diagram illustrating a network with content and service providers for a DVR according to an embodiment.

FIG. 18A illustrates a network with content and service providers for a DVR, according to an embodiment. The system comprises DVR 1802 which is communicatively coupled to network 1805 through any communication interface, such as an Ethernet interface or wireless communications port. The functionality of a DVR is typified in U.S. Pat. No. 6,233,389 which is owned by the Applicants and is hereby incorporated by reference. The system also includes service provider server ("service provider") 1804, storage 1806 for service provider 1804, content provider 1808, personal computer 1810 and portable device 1812.

Personal computer 1810 may be a personal computing device, such as a desktop computer or laptop computer, and is also coupled to network 1805 through any communications interface, including wireless. Portable device 1812 may be any handheld computing device, cellular phone, portable media player, or any other portable device capable of displaying multimedia content and is also coupled to network 1805 through any communications interface, including wireless. DVR 1802, personal computer 1810, and portable device 1812 each communicate as client with service provider server 1804 through network 1805. In an embodiment, DVR 1802, personal computer 1810, and portable device 1812 each communicate with content provider 1810 through network 1805. Storage 1806 may be internal to service provider 1804 (not shown) or external to service provider 1804 as shown.

Network 1805 may be implemented by any medium or mechanism that provides for the exchange of data between devices in the communication system. Examples of network 1805 include, without limitation, a network such as a Local Area Network (LAN), Wide Area Network (WAN), the Internet, one or more terrestrial, satellite or wireless links, etc. Alternatively or additionally, any number of devices connected to network 1805 may also be directly connected to each other through a communications link.

In an embodiment, content provider 1808 provides broadcast program content to DVR 1802 via cable, satellite, terrestrial communication, or other transmission method. Broadcast program content may include any multimedia content such as: audio, image, or video content. In an embodiment, content provider 1808 provides multimedia content, such as any downloadable content, through network 1805 to DVR 1802, personal computer 1810, or portable device 1812.

In an embodiment, DVR 1802 communicates with service provider 1804 and storage 1806, which provide program guide data, graphical resources (such as fonts, pictures, etc.), service information, software, advertisements, event identification data, and other forms of data that enable DVR 1802 to operate independently of service provider 1804 to satisfy user interests.

In an embodiment, content provider 1808 may provide, to service provider 1804, content data or any metadata, including promotional data, icons, web data, and other information. Service provider 1804 may then interpret the metadata and provide the content data metadata to DVR 1802, personal computer 1810, or portable device 1812.

Figure 18B:
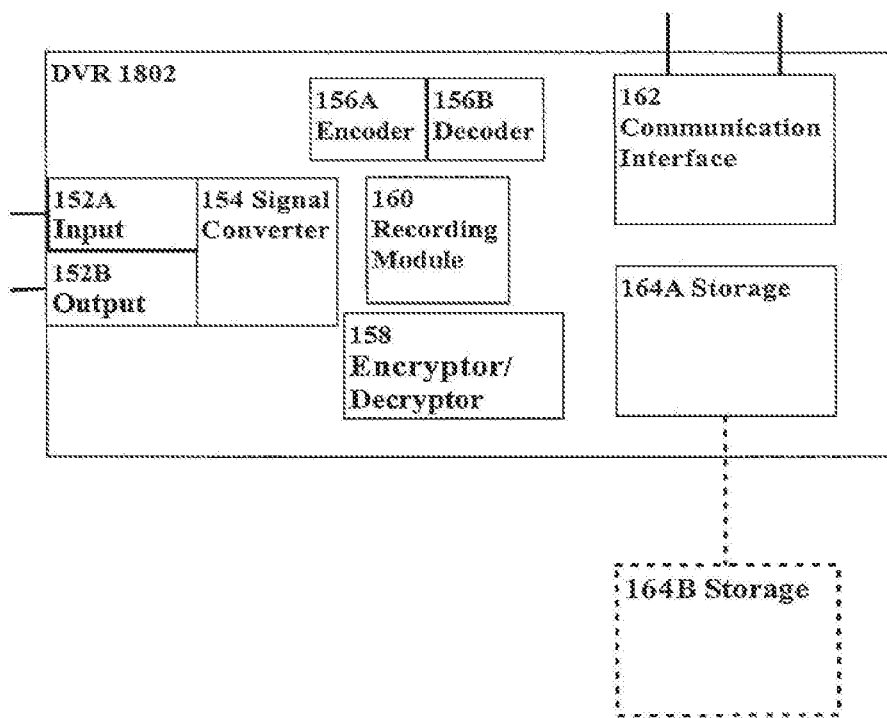
FIG. 18B is a block diagram illustrating a general overview of the components of a Digital Video Recorder (DVR) according to an embodiment.

Referring to FIG. 18B, in an embodiment, DVR 1802 generally comprises one or more components, signified by signal converter 154, that may be used to digitize an analog television signal and convert it into a digital data stream or accept a digital data stream. An example of the internal structure and operation of a DVR is further described in U.S. Pat. No. 6,233,389.

DVR 1802 receives broadcast signals from an antenna, from a cable TV system, satellite receiver, etc., via input 152A. Input 152A may comprise one or more tuning modules that allow one or more signals to be received and recorded simultaneously. For example, a TV input stream received by input 152A may take the form of a National Television Standards Committee (NTSC) compliant signal or a Phase Alternating Line (PAL) compliant broadcast signal. For another example, a TV input stream received by input 152A may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal.

An MPEG-2 transport multiplex supports multiple programs in the same broadcast channel with multiple video and audio feeds and private data. Input 152A tunes to a particular program in a channel, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input 152A and passed to the other modules as if the signals had been delivered via an MPEG-2 private data channel.

Recording module 160 records the incoming data stream by storing the digital data stream on at least one storage facility, signified by storage 164A/164B that is designed to retain segments of the digital data stream. Storage 164A/164B may be one or more non-volatile storage devices (e.g., hard disk, solid state drive, USB external hard drive, USB external memory stick, USB external solid state drive, network accessible storage device, etc.) that are internal 164A and/or external 164B. A signal converter 154 retrieves segments of the data stream, converts the data stream into an analog signal, and then modulates the signal onto a RF carrier, via output 152B, through which the signal is delivered to a standard TV set. Output 152B may alternatively deliver a digital signal to a TV set or video monitor. For example, DVR 1802 may utilize a High-Definition Multimedia Interface (HDMI) for sending digital signals to a TV via a HDMI cable.

DVR 1802 also includes a communication interface 162, through which the DVR 1802 communicates with network 1805 via Ethernet, wireless network, modem, or other communications standard. Further, DVR 1802 may be integrated into a TV system such that the components described above are housed in a TV set capable of performing the functions of each component of DVR 1802.

In another embodiment, DVR 1802 generally comprises one or more components used to receive, record, store, transfer and playback digital data signals from one or more sources, such as a PC, a DVR, a service provider, or content server. DVR 1802 can transfer digital data signals to another DVR or PC. DVR 1802 may encode or decode digital signals via encoder 156A and decoder 156B into one or more formats for playback, storage or transfer. According to one embodiment, encoder 156A produces MPEG streams. According to another embodiment, encoder 156A produces streams that are encoded using a different codec. Decoder 156B decodes the streams encoded by encoder 156A or streams that are stored in the format in which the streams were received using an appropriate decoder. DVR 1802 can also encrypt or decrypt digital data signals using encryptor/decryptor 158 for storage, transfer or playback of the digital data signals.

In an embodiment, DVR 1802 communicates with service provider 1804, which provides program guide data, graphical resources such as brand icons and pictures, service information, software programs, advertisements, and other forms of data that enable DVR 1802 to operate independently of the service provider 1804 to perform autonomous recording functions. Communication between DVR 1802 and service provider 1804 may use a secure distribution architecture to transfer data between the DVR 1802 and the service provider 1804 such that both the service data and the user's privacy are protected.

DVR Synchronization with Service Provider Via Polling

An embodiment of DVR synchronization with service provider 1804 via polling may be described with respect to FIG. 18A and FIG. 18B. Storage 164A/164B of DVR 1802 comprises data program guide data, season pass data, wish list data, now playing data, to do data (e.g., what programs are scheduled), suggestions data, etc. Storage 1806 of service provider 1804 also comprises a copy of such data for DVR 1802. For example, storage 1806 comprises one or more databases, which comprise tables that are associated with DVR 102. As well, storage 106 comprises copies of all other DVR clients (e.g., as data stored in tables associated with each of the other DVR clients), which service provider 1804 supports and with which service provider 1804 communicates (not shown.) DVR 1802 periodically establishes a Secure Sockets Layer (SSL) connection to and contacts ("polls") service provider 1804 to initiate synchronization between data stored in storage 164A/164B of DVR 1802 and data stored in storage 1806 of service provider 1804. Synchronization between data stored in storage 164A/164B of DVR 1802 and data stored in storage 1806 of service provider 1804 as used herein means causing data stored in storage 164A/164B of DVR 1802 and data stored in storage 1806 to represent the same content. For example, in an embodiment, DVR 1802 contacts service provider 1804 via network 1805 to synchronize every fifteen minutes. In an embodiment, synchronization is achieved by DVR 1802 contacting service provider 1804 and sending a subset of local data in storage 164A/164B, e.g., data that reflects updates to the local data stored in storage 164A/164B, service provider 1804 that stores the data on storage 1806.

In another example, a viewer, from the viewer's PC 1810, adds a new season pass for a series, such as The War, to the viewer's collection of season passes. In this example, the viewer, from the viewer's PC 1810, adds the new season pass for the series by causing PC 1810 to send data related to adding the season pass to service provider 1804, which then stores the data in the appropriate table(s) associated with the viewer's DVR 1802 in the database on storage 1806. When DVR 1802 initiates synchronizing data with service provider 1804, data reflecting the newly added season pass contained in storage 1806 is sent to DVR 1802. It should be appreciated that DVR/service provider synchronization is not limited by which element (e.g., DVR 1802 or service provider 1804) initiates synchronization and sends updated data to the receiving element. For example, DVR 1802 may initiate synchronization or service provider 1804 may initiate synchronization. As another example, the particular element (e.g., DVR 1802 or service provider 1804) designated to initiate the synchronization process may be the result of a business or design decision.

An example DVR/service provider synchronization process is as follows. A user is logged onto the internet (e.g., network 1805) using personal computer 1810. For example, the user is navigating the TiVo Central™ Online web page and from the TiVo Central™ Online remote scheduling facility schedules a program to record on the user's DVR 1802. The message to record the program gets sent from the web page interface on the personal computer 1810 to service provider 1804. The program information is added to the database tables associated with the user's DVR 1802 by service provider 1804, e.g., on storage 1806 comprising data that represents the schedule of programs for the user's DVR 1802. The next time that DVR 1802 and service provider 1804 synchronize data, data reflecting the schedule with the added program is sent by service provider 1804 from storage 1806 to DVR storage 164A/164B. DVR 1802 is thus configured to record the added program according to the user's request.

Instant Message Protocol

Figure 19A:
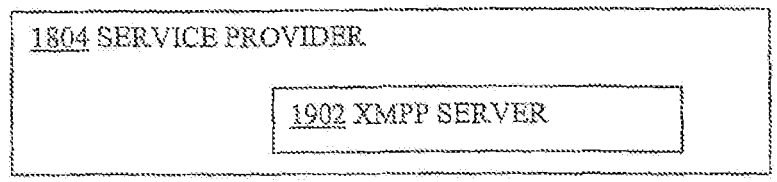
FIG. 19A is a block diagram illustrating service provider comprising an XMPP server internally according to an embodiment.
Figure 19B:
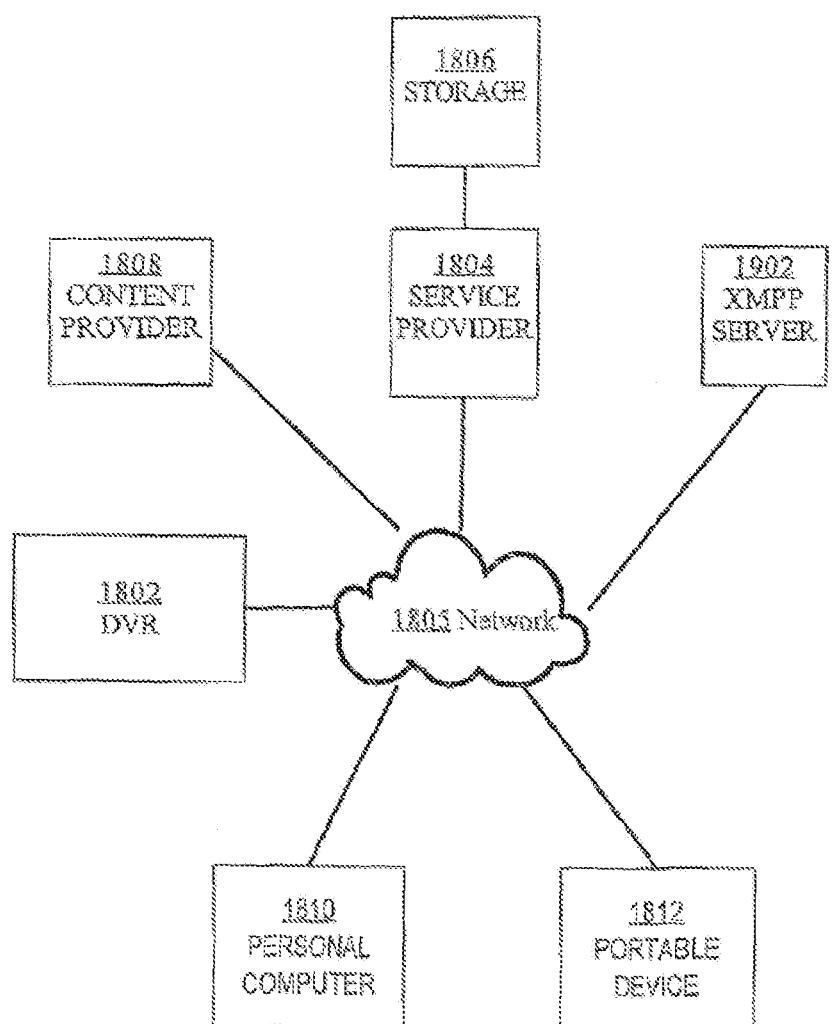
FIG. 19B is a block diagram illustrating XMPP server residing externally to service provider according to an embodiment.

In an embodiment, DVR 1802, personal computer 1810, portable device 1812, or any other appropriately configured device, may communicate with service provider 1804 on network 1805 using a secure client-server instant message protocol to transfer data between DVR 1802, personal computer 1810, portable device 1812, or any other appropriately configured device and service provider 1804 such that both the service data and the user's privacy are protected. In an embodiment, data may be transferred using secure client-server instant message communications protocol over network 105 via wired, wireless, or any other communication interface. In an embodiment, DVR 1802 receives and sends instant messages through communication interface 162. As an example, on a cell phone, a user might select a program to be recorded and the request to record the program is sent as an instant message to service provider 1804. Instant message communication between DVR 1802, personal computer 1810, or portable device 1812 and service provider 1804 may be described with reference to FIG. 19A and FIG. 19B. FIG. 19A is a block diagram of service provider 1804 comprising an Extensible Messaging and Presence Protocol (XMPP) server 1902 internally. In an embodiment, XMPP server 1902 is communicatively connected to network 1805 and external to service provider 1804, as shown in FIG. 19B. It should be appreciated that in an embodiment, any system configured for instant message communications protocol may be contemplated and that any embodiment described herein using XMPP is meant by way of example and is not meant to be limiting. For example AOL Instant Messenger (AIM®), Microsoft's Windows Live, ICQ®, or Short Messaging Services (SMS) are each a system that may be used for instant message communications protocol in accordance with one or more embodiments.

In an embodiment, commands from any of DVR 1802, personal computer 1810, or portable device 1812 are sent via network 1805 to service provider 1804 as instant messages. After receipt of such instant messages, service provider 1804 updates appropriate database tables in storage 1806 that are associated with the user associated with the command. As an example, in an embodiment, after receipt of one or more instant messages containing information relating to a particular update to a user's DVR, service provider 1804 updates appropriate database objects in central site database 100, as described in the commonly owned U.S. Pat. No. 6,728,713, titled, "Distributed Database Management System," dated Apr. 27, 2004, which is incorporated herein in its entirety as if fully set forth herein. It should be appreciated that such configurations are by way of example only and are not meant to be limiting.

In an embodiment, XMPP is an open source protocol for real-time extensible instant messaging (IM) over a network as well as presence information, such as used for buddy lists. XMPP is based on open standards, similar to email. Similar to a user in an open email environment, a user in an open XMPP environment with a domain name and a suitable Internet connection may run an XMPP server and communicate directly with users on other XMPP servers. An example client XMPP application is Google Talk. Google Talk is a Windows application for Voice over IP and instant messaging, offered by Google®.

An example XMPP message delivery process from UserA to UserB is as follows. UserA sends a message intended for UserB to UserA's XMPP server. If UserB is blocked on UserA's server, then the message is dropped. Otherwise, UserA's XMPP server opens a connection to UserB's XMPP server. An embodiment of the opened connection may include obtaining authorization and obtaining an encrypted connection. After the connection is established, UserB's XMPP server checks if UserA is blocked on UserB's XMPP server. If UserA is blocked on UserB's XMPP server, the message is dropped. In an embodiment, if UserB is not presently connected to UserB's XMPP server, the message is stored for later delivery. It should be appreciated that other options apply, such as dropping the message. In an embodiment, if UserB is presently connected to UserB's XMPP server, the message is delivered to UserB. It should be appreciated that in an embodiment, UserA's server and UserB's server are the same server. For instance, UserA sends instant messages to UserB and receives instant messages from UserB by sending messages to and receiving messages from an XMPP server and UserB sends instant messages to UserA and receives messages from UserA by sending messages to and receiving messages from the XMPP server.

Further details on example structure and functionality of XMPP may be found in The Internet Society's "Request For Comment" (RFC) documents RFC3920, "Extensible Messaging and Presence Protocol: Core" and RFC3921, "Extensible Messaging and Presence Protocol: Instant Messaging and Presence."

Instant Message Synchronization

In an embodiment, DVR 1802 is an instant messaging client and hosts an instant message client application. DVR 1802 attempts to maintain an instant messaging connection with instant message XMPP server 1902 at all times. Service provider 1804 is also an instant messaging client and hosts an instant message client application. As well, service provider 1804 attempts to maintain an instant messaging connection with instant message XMPP server 1802 at all times. In an embodiment, DVR 1802, XMPP server 1902, and service provider 1804 communicate according to open standard XMPP protocol, e.g., as described above. In an embodiment, service provider 1804 comprises related software that enables service provider 1804 to communicate with storage 1806. It should be appreciated that in certain contexts herein, references to service provider 1804 is used in the collective sense and is meant to include reference to the related software that manages storage 1806.

An embodiment of instant message synchronization may be described with reference to FIG. 20A. FIG. 20A is a flow diagram showing an example DVR/service provider synchronization process flow. This example synchronization process flow begins with a user remotely requesting a programming event, e.g., to add a program, via service provider 1804 (Step 2002.) For example, PC 1810 may request to add a program to the user's schedule of recordings for DVR 1802. For example, through PC 1810 the user may remotely add a program using TiVo Central™ Online through service provider 1804. Service provider 1804 updates database tables on storage 106 that are associated with the user's DVR to include the program (Step 2004.) As well, service provider 1804 sends an instant message to DVR 1802 via XMPP server 1902 (Step 2006.) It should be appreciated that, in an embodiment, DVR 1802 attempts to maintain the connection to XMPP server 1902 at all times, reconnecting automatically whenever the connection drops. Similarly, it should be appreciated that, in an embodiment, service provider 1804 attempts to maintain the connection to XMPP server 1902 at all times, reconnecting automatically whenever the connection drops. In either case, when the connection to XMPP server 1902 is not up for any reason, the instant message is discarded. In the example, the instant message informs DVR 1802 that a change has been made to the database tables that are associated with the user's DVR in storage 1806 and requests that DVR 1802 synchronize data in storage 164A/164B with data in storage 106. In an embodiment, the notification causes DVR 1802 to open a new SSL connection with service provider 1804 specifically for the synchronization process and to close the newly opened SSL connection when the synchronization of the relevant data in storage 1806 with data in storage 164A/164B is done (Step 2008.) It should be appreciated that certain details in the example are by way of illustration only and are not meant to be limiting. As an example, while a remote user requests a change via PC 1810, the request for change may be sent from any configurable device, such as portable device 1812.

Figure 20B:
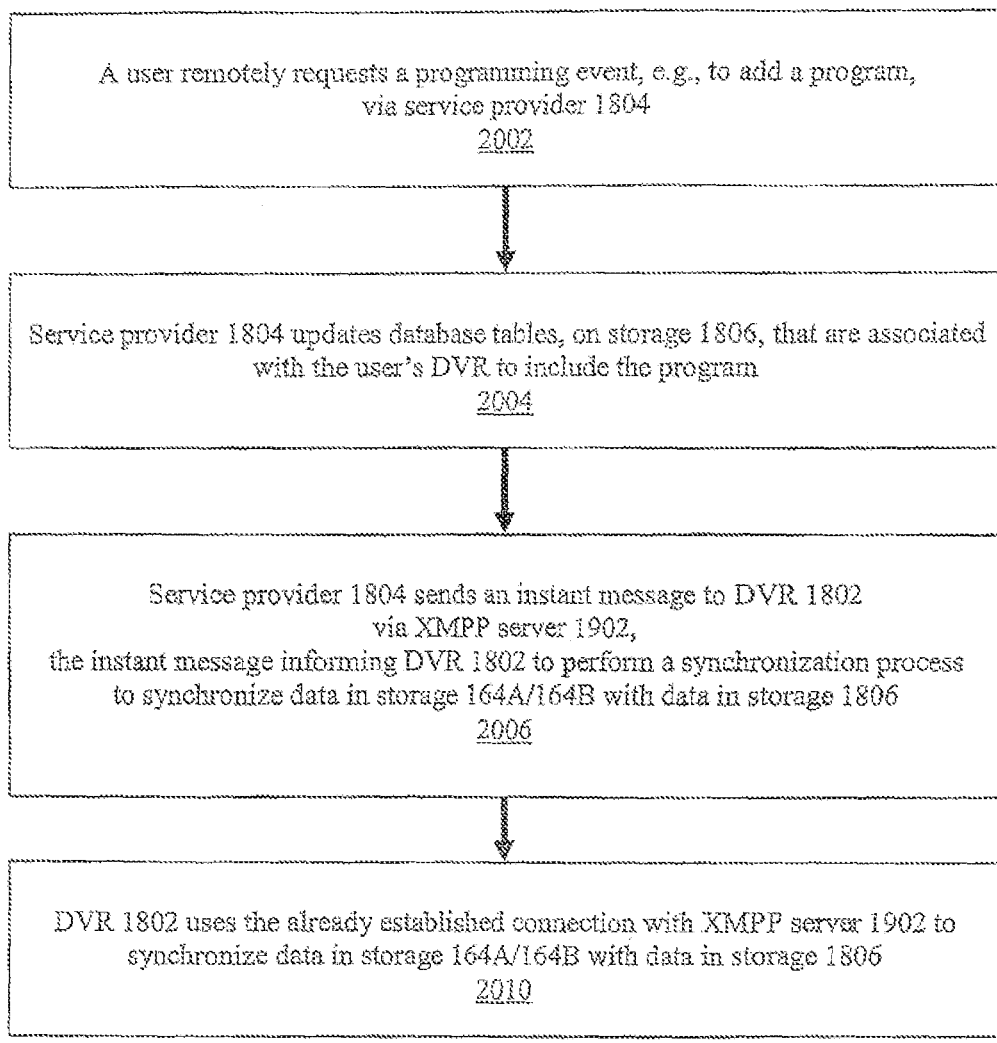
FIG. 20B is a flow diagram showing an example DVR/service provider synchronization process flow according to an embodiment.

Another embodiment of DVR/service provider synchronization may be described with reference to FIG. 20B. FIG. 20B is a flow diagram showing an example DVR/service provider synchronization process flow that is similar to FIG. 20A, however with a different last step. As in FIG. 20A, the example synchronization process flow of FIG. 20B begins with a user remotely requesting a programming event, e.g., to add a program, via service provider 1804 (Step 2002.) For example, PC 1810 requests the service to add a program to the user's schedule of recordings for DVR 1802. For example, through PC 1810 the user may remotely add a program using TiVo Central™ Online through service provider 1804. Service provider 1804 updates database tables on storage 1806 that are associated with the user's DVR to include the program (Step 2004.) As well, service provider 1804 sends an instant message to DVR 1802 via XMPP server 1902 (Step 2006.) It should be appreciated that, in an embodiment, DVR 1802 attempts to maintain the connection to XMPP server 1902 at all times, reconnecting automatically whenever the connection drops. Similarly, it should be appreciated that, in an embodiment, service provider 1804 attempts to maintain the connection to XMPP server 1902 at all times, reconnecting automatically whenever the connection drops. In either case, when the connection to XMPP server 1902 is not up for any reason, the instant message is discarded. In the example, the instant message informs DVR 1802 that a change has been made to the database tables that are associated with the user's DVR in storage 1806 and requests that DVR 1802 synchronize data in storage 164A/164B with data in storage 106. Responsive to the message, DVR 1802 uses the already established connection with XMPP server 1902 to pass and/or receive the synchronization data to synchronize data in storage 164A/164B with data in storage 1806 (Step 2010). It should be appreciated that certain details in the example are by way of illustration only and are not meant to be limiting. For instance, while, in the example, a remote user requests a change from PC 1810, the request for change may be sent from any configurable device, such as portable device 1812.

It should be appreciated that client-server instant message protocol in a DVR environment is not limited to synchronizing schedule-related and recording-related data. Indeed, any type of data stored in storage 1806 of service provider 1804 may be synchronized with data stored in DVR storage 164A/164B and any type of data stored in DVR storage 164A/164B may be synchronized with data stored in storage 1806 of service provider 1804.

As well, through an instant message connection, data reflecting any type of activity from any client may be sent to the service provider storage on a real-time basis. The type of and use of such gathered data is limitless. For example, the data may be aggregated and analyzed for marketing or towards providing better customer service. As another example, data gathered for a particular user may be used to initiate a customized or targeted process for that particular user, and so forth.

Scalability and Robustness

In an embodiment, the DVR attempts to maintain an SSL connection with an XMPP server at all times, reconnecting whenever the connection is dropped. Because the DVR maintains the SSL connection with the XMPP server, the DVR has the capability to use instant messaging at all times, except during those short intervals when the connection is temporarily dropped. For example, the DVR may employ an already established connection with the XMPP server to perform the synchronization with the service provider. Thus, the DVR using the established connection to perform synchronization provides scalability.

In another embodiment, one or more XMPP servers are configured not to store messages that are sent to any of the one or more XMPP servers. For example, an XMPP server receives an XMPP message and passes the XMPP message on to a recipient, such as the DVR, without using additional XMPP server resource for storing the message. Because the one or more XMPP servers may not need to use additional resource to store XMPP messages, more XMPP server resource may be used at a given time for processing more messages, thus providing greater scalability.

In an embodiment, DVR/service provider synchronization via instant messaging is robust because the DVR and service provider automatically reconnect after any connection failures during the synchronization process.

In another embodiment, DVR/service provider synchronization is rendered robust by a configuration that uses a combination of DVR/service provider synchronization by polling and DVR/service provider synchronization by instant messaging. For example, an administrator may set DVR/service provider synchronization by polling to operate every twenty-four hours, while DVR/service provider synchronization by instant messaging is operable as well. The combination of synchronization by polling and synchronization by instant messaging renders a robust synchronization feature. For example, suppose that an XMPP server crashes at the time that the XMPP server is attempting to send a message to a DVR, e.g., a request to synchronize, and that the crash causes the sending of the message to fail. In an embodiment, the DVR may be updated from the synchronization by polling process, possibly at a later time. Thus, synchronization is successful and robust even in a case, which may be rare, when an XMPP message is lost.

Real-Time Audience Measurement

An embodiment of a real-time audience measurement feature comprises instant message protocol in a DVR environment to obtain audience measurement data in real-time to facilitate many processes, such as, but not limited to, modifying the scheduled recording time of a program in real-time, bookmarking in real-time, and gathering real-time ratings on commercials and viewership.

In an embodiment, audience measurement features of commonly owned U.S. patent application Ser. No. 10/189, 989 entitled, "Audience Measurement System," filed Jul. 5, 2002, incorporated in its entirety herein by this reference thereto, and described hereinabove are implemented using an instant message connection to transport one or more television viewing objects from a client system to a server system as they are created (e.g., in real-time). For example, in an embodiment, such television viewing objects are transported from a DVR 1802 to a service provider 1804 by way of an XMPP server 1902. In an embodiment, such television viewing objects are also stored on persistent storage device 164A/164B and transported to service provider 1804 as previously described. In an embodiment, real-time audience measurement system 2102 receives these television viewing objects and processes them to generate reports, displays, notifications or other outputs that describe aspects of the real-time operation of a population of DVRs. In an embodiment, received television viewing objects are also queued for processing as if they had been received as part of an uploaded slice, as described previously. In an embodiment, the real-time audience measurement system protects viewer privacy while processing such television viewing objects. In an embodiment, some television viewing objects are transported via instant message, while other television viewing objects are periodically uploaded in a slice as described previously.

In an embodiment, television viewing objects are created by correlating a viewer's input while viewing a video program with segments of the video program. In an embodiment, a video program segment may be identified by a number of techniques, including, but not limited to: an absolute time measure, such as Greenwich Mean Time (GMT); a time offset from the beginning of the recording; using words or phrases detected in Closed Captioning included in the program; using embedded tags in the program itself; or recognizing features in the audio or video of the program, such as transitions between program content and advertisements.

In an embodiment, using a privacy option status that is associated by service provider 1804 with each DVR 1802, the information contained within the received television viewing objects may be stored by the service provider such that the information is anonymous, or it may be stored such that the information may be associated with a specific DVR. Such information may then be aggregated for use by post-processors, such as other servers connected to or part of service provider 1804, to generate the outputs of the real-time audience measurement system. For example, data in these outputs may include, but are not limited to: aggregate viewer behavior in relation to a particular television video program; aggregate viewer response to particular commercial pods; and aggregate viewer behavior in relation to tuning out of a particular television program and viewer tune-in destinations. In an embodiment, service provider 1804 analyzes aggregate information to predict viewing activity and program ratings. In an embodiment, service provider 1804 correlates specific DVR information with demographic information about the household owning the DVR to predict demographic response to programs that are similar to one another. In an embodiment, tags are inserted into television programs that the client (e.g., DVR 1802) recognizes during playback. The client uses such tags to accurately track viewer behavior during particular events in the tagged television program. In an embodiment, informational data reflecting the tracked viewer behavior during particular events in the tagged television program are sent in a television viewing object by instant message to service provider 1804 for further analysis.

In an embodiment, the sending of television viewing objects in instant messages is performed using appropriate privacy and security mechanisms, such as authentication (e.g., via smartcard, voice recognition, or fingerprint) and standard encryption/decryption technology.

Real-Time Audience Measurement

An embodiment of real-time audience measurement can be described with reference to FIG. 21A. FIG. 21A is a block diagram illustrating service provider 1804 comprising a real-time audience measurement server 2102. It should be appreciated that real-time audience measurement server 2102 is shown as residing on service provider 1804 for illustrative purposes only and is not meant to be limiting. For example, components of real-time audience measurement server 2102 may reside completely on another server on network 1805 or may reside in a distributed manner on one or more servers on network 1805 (not illustrated.)

In an embodiment, a DVR (e.g., DVR 1802) is configured with instant message client software to send and receive instant messages and configured with instructions to notify real-time audience measurement application 2102 whenever certain television viewing objects are created. The user of the configured DVR may implicitly cause the creation of such a television viewing object. For example, using a remote control or other means, the user chooses to view and record the Superbowl football game, causing the creation of a television viewing object.

In an embodiment, real-time audience measurement is implemented using the instant message connection as a transport protocol described hereinabove, in conjunction with real-time audience measurement server 2102 as depicted in FIG. 21A. According to the embodiment, the configured DVR already has an established, secure connection to XMPP server 1902. When a television viewing object is created, the configured DVR sends an instant message containing the television viewing object through XMPP server 1902 for delivery to real-time audience measurement server 2102. When certain conditions are met, for example, no users are blocked from XMPP communications, XMPP server 1902 forwards the instant message to real-time audience measurement server 2102. In this way, real-time audience measurement server 2102 is able to obtain data about an audience in real-time and to perform post-processing on the data such as in accordance with business processes. It should be appreciated that certain details in the example are by way of illustration only and are not meant to be limiting.

In an embodiment, real-time audience measurement server 2102 comprises processing algorithms and storage capability to process received television viewing objects and store the resulting audience measurement data. For example, real-time audience measurement server 2102 computes, using messages from the set of configured DVRs, the number of audience members that viewed any part of the Superbowl. In another example, real-time audience measurement server 2102 may compute in real-time or near real-time the number of audience members that viewed certain commercials during the Superbowl broadcast. In another example, real-time audience measurement server 2102 may compute in real-time or near real-time the number of audience members that fast-forwarded through commercials.

For example, and referring to FIG. 21B, a particular DVR is playing or recording the Superbowl (Step 2120.) A user fast-forwards through a commercial or rewinds to replay a particular football play (Step 2122.) The user's input (fast-forwarding or rewinding) is correlated with the current segment of the video program (the segment containing the commercial or the segment containing the particular football play) being played and a corresponding television viewing object is created. The DVR sends an instant message to real-time audience measuring server 2102 via service provider 1804, where the instant message contains the television viewing object indicating what user action ("event") took place (fast-forwarding or rewinding) and the particular segment that was being played while the event took place (Step 2124.) Server 2120 may immediately include the event in real-time statistical information and/or aggregate the event with other events for post-processing, such as gathering statistics (Step 2126.) For example, real-time audience measurement server 2102 may compute in real-time the number of audience members that rewound the recording to replay the particular football play. In another example, real-time audience measurement server 2102 may compute in real-time the number of audience members that fast-forwarded through the commercial. It should be appreciated that the examples described above are meant to be illustrative only and are not meant to be limiting.

Real-Time Ratings

In an embodiment, real-time ratings of programs are determined using instant message protocol as transport. In an embodiment, a set of DVRs are configured to detect each time a user presses a button on a remote control device and are configured to send a corresponding instant message. Continuing with the example from above and referring to FIG. 21A, from the set of configured DVRs that are displaying the Superbowl, instant messages are sent to a real-time ratings server 2104 each time a user of one of the configured DVRs in the set presses a button on a remote control device. The instant message sent to real-time ratings server 2104 comprises a television viewing object indicating the button pushed, the program that was playing when the button was pushed, and an indication of the video segment that was being viewed when the button was pushed. In an embodiment, the video segment is identified as a time offset relative to the beginning of the program. Real-time ratings server 2104 may determine and/or compute one or more results. Examples of such determined and/or computed results comprise, but are not limited to, the percentage of viewers that changed channels during a certain commercial, the percentage of viewers that rewound and played back a commercial starring a popular actress, the percentage of viewers that fast-forwarded past a commercial (possibly implying that the commercial was not viewed) and so on. In an embodiment, the determined and/or computed results are used to rate commercials in real-time.

In an embodiment, determining real-time ratings is implemented using the instant message connection as transport protocol described hereinabove, and depicted in FIG. 20B, in conjunction with real-time ratings server 2104 as depicted in FIG. 21A. In the embodiment, the configured DVR already has established a secure connection to XMPP server 1902. The configured DVR sends an instant message containing one or more television viewing objects through XMPP server 1902 for delivery to real-time ratings server 2104. When certain conditions are met, for example, no users are blocked from XMPP communications, XMPP server 1902 sends the instant message to real-time ratings server 2104. In an embodiment, real-time ratings server 2104 is able to gather data about commercials and viewership and to perform post-processing on the data in accordance with business processes, and so on. It should be appreciated that certain details in the example are by way of illustration only and are not meant to be limiting.

Real-Time Recording Length Changes

In an embodiment, when DVR 1802 is recording a program, the user may indirectly modify, in real-time, DVR settings for the recording of such program. Consider the example of a DVR recording the Superbowl in real-time. The DVR user finds that the Superbowl football game seems to be taking a longer time than expected to finish and the user believes that the last part of the Superbowl might not be recorded because the scheduled recording time is too short.

In an embodiment, when the user believes the recording time is too short, the user may make an indirect request in real-time to extend the Superbowl recording, possibly overriding another scheduled recording. For instance, from portable device 1812, such as a cell phone, the user may call into and/or log into service provider 1804 and request, in real-time, extension of the Superbowl recording. Additionally, in an embodiment, service provider 1804 may give real-time user feedback that the operation, e.g., to extend the Superbowl recording, succeeded or failed.

In an embodiment, real-time recording length changes is implemented using the instant message connection as transport protocol described hereinabove, and depicted in FIG.

20B, in conjunction with a real-time recording length changes server 2106 in FIG. 21A. For instance, in response to the user's request to extend the recording time, real-time recording length changes server 2106 sends an instant message through XMPP server 1902 for delivery to user's DVR 1802. When certain conditions are met, for example, no users are blocked from XMPP communications, XMPP server 1902 sends the instant message to DVR 1902 to add recording and/or playing time to the particular program. For example, DVR 1802 may extend the Superbowl broadcast recording by 30 minutes. It should be appreciated that certain details in the example are by way of illustration only and are not meant to be limiting.

In an embodiment, a customer service representative associated with the service provider 1804, through real-time recording length changes server 2106, may cause additional recording time to be added to or subtracted from a particular program that is currently being recorded on participating, configured DVRs. For example, a customer service representative may, as a service, view a live program, such as the Superbowl, and determine that the likelihood is high that the live program will run longer than scheduled. When the customer service representative determines that the program may run longer than scheduled, the customer service representative may cause, through real-time recording length changes server 2106, an instant message to be sent to all participating, configured DVRs to add a certain amount of time to the recording of the program. In an embodiment, an automatic message from a broadcast service to service provider 1804 may cause additional recording time to be added to or subtracted from a particular program that is currently being recorded on participating, configured DVRs. For example, an automatic message may indicate that a program may run shorter than expected and may cause, through real-time recording length changes server 2106, an instant message to be sent to all participating, configured DVRs to subtract a certain amount of time from the recording of the program.

In an embodiment, an instant message is sent in real-time to all DVRs that are scheduled to record a certain program with the message to add more time to the end of the recording of the certain program. For example, suppose data, from content provider 1808 to service provider 1804, about a particular program indicates that the particular program is one hour long. Suppose further that many DVRs have made a request to record the particular program when it broadcasts. Suppose further that, for some reason, the length of the program is not one hour, but is one and a half hours. In this example, and according to the embodiment, the error is detected either by a human or by an automatic data checking mechanism. In the embodiment, the detection of the error causes real-time recording length changes server 2106 to send instant messages to all participating DVRs to automatically add the increase in program time to the scheduled recording time. It should be appreciated that variations on the embodiment, which comprise whether DVRs opt-in or opt-out of the service about whether DVRs permit such change to the scheduled program on a case-by-case basis (e.g., program-by-program basis), and so on, are contemplated.

In an embodiment which comprises synchronizing by polling as described above, an instant message is sent from real-time recording length changes server 2106 to all participating DVRs that requests and causes the DVRs to run a scheduling application. Each DVR running the scheduling application causes the DVR at some later point in time (or could be immediately after the scheduling application is run) to synchronize data with data stored by the service provider. For example, after synchronizing by polling, each DVR has received the updated, e.g., correct, data regarding the particular program, resulting in the recording time for the particular program to be changed accordingly (increased or decreased.)

Real-Time Bookmarking

In an embodiment, while viewing a video program, a user may create, in real-time, a bookmark at any placement in the program, e.g., at any position within a concurrently displayed segment of a video program. For example, as a user is viewing a program, a user may press an indicator on an associated remote control device to place a bookmark at that position within the displayed segment of the video program that is being viewed. In an embodiment, the indicator may be the thumbs-up button or the thumbs-down button on a remote control device. For example, the user may press the thumbs-up button twice to place the bookmark. It should be appreciated that any type of indicator is contemplated, including, but not limited to, a bookmark button on an associated remote control device for the purpose of creating a bookmark. In an embodiment, the bookmark takes the form of a television viewing object identifying the program and a video segment within the program.

In an embodiment, real-time bookmarking is implemented using the instant message connection as transport protocol described hereinabove, and depicted in FIG. 20B, in conjunction with a real-time bookmarking server 2108 as depicted in FIG. 21A. For instance, in response to a user indicating to place a bookmark at a certain position within the video program being viewed, DVR 1802, which already has an established, secure connection to XMPP server 1902, sends an instant message through XMPP server 1902 for delivery to real-time bookmarking server 2108. When certain conditions are met, for example, no users are blocked from XMPP communications, XMPP server 1902 forwards the instant message to real-time bookmarking server 2108. In an embodiment, real-time bookmarking server 2108 thus is able to gather data about bookmark placements in real-time and to perform post-processing on the data in accordance with business processes, and so on. It should be appreciated that certain details in the example are by way of illustration only and are not meant to be limiting.

In an embodiment, in response to the user indicating to place a bookmark at a certain position within the displayed or broadcasted video, the user's DVR creates a television viewing object containing information such as the program being viewed and a video segment indicated by the viewer. The DVR sends an instant message containing this television viewing object in real-time via XMPP server 1902 to a real-time bookmark server 2108.

In an embodiment, real-time bookmark server 2108 receives and stores in storage 1806 bookmark data from one or more configured DVRs. In an embodiment, such received bookmark data is used by social network applications, servers, and users. For example, according to the embodiment, a user viewing a program may press a bookmark button on the user's remote control device to indicate, for example, that something interesting happened at that point in the program. In an embodiment, pressing a bookmark button on the user's remote control device causes real-time bookmark server 2108 to send a message to the user's social network servers (e.g., Facebook® or mySpace.com®), where the message comprises information about the bookmark and related information that may be of interest to the user's friends. This information might then be displayed on the user's social network web page, or otherwise communicated to the user's friends. In an embodiment, this information may be sent to a friend's cell phone via a text message.

In an embodiment, real-time bookmark server 2108 tracks, e.g., stores, bookmark data related to a particular program and uses such data in post-processing. In an embodiment, bookmark data that are collected by real-time bookmark server 2108 are correlated. In an embodiment, bookmark data for a program are correlated to show statistical relationships among the data.

In an embodiment, data reflecting users' preferences, such as bookmark data, thumbs-up data, and thumbs-down data, are sent by DVRs in real-time, each sending an instant message, to service provider 1804. Servers associated with service provider 1804, such as real-time audience measurement 2102, real-time ratings 2104, real-time bookmarking 2108, and the like, gather such data reflecting users' preferences and perform correlations and compute statistics on such data in real-time. In response to performing correlations and computing statistics on such data, such servers may determine relevant information, such as certain users' likes and dislikes, and send the determined relevant information to other users. For example, users may be interested in receiving data about how other users rate certain programs, or what are the most bookmarked spots within a program.

In an embodiment, data reflecting a user's preferences may be forwarded from servers associated with service provider 1804, such as real-time audience measurement 2102, real-time ratings 2104, real-time bookmarking 2108, and the like, to the user's social network servers. This data might then be displayed on the user's social network web page, or otherwise communicated to the user's friends. In an embodiment, this information may be sent to a friend's cell phone via a text message.

Hardware Overview

Figure 22:
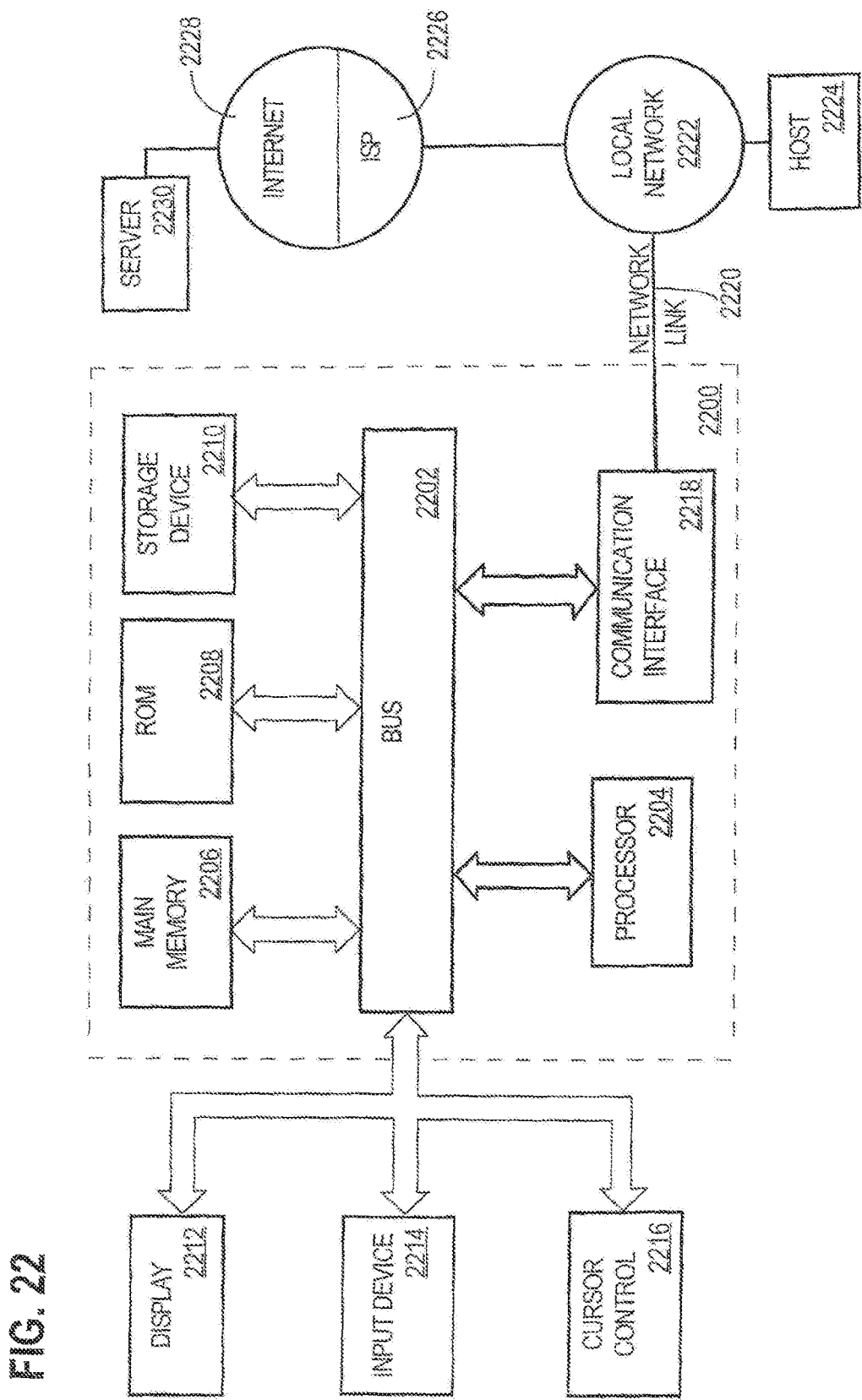
FIG. 22 is a block diagram that illustrates a computer system upon which an embodiment may be implemented.

FIG. 22 is a block diagram that illustrates a computer system 2200 upon which an embodiment may be implemented. Computer system 2200 includes a bus 2202 or other communication mechanism for communicating information, and a processor 2204 coupled with bus 2202 for processing information. Computer system 2200 also includes a main memory 2206, such as a random access memory (RAM) or other dynamic storage device, coupled to bus 2202 for storing information and instructions to be executed by processor 2204. Main memory 2206 also may be used for storing temporary variables or other intermediate information during execution of instructions to be executed by processor 2204. Computer system 2200 further includes a read only memory (ROM) 2208 or other static storage device coupled to bus 2202 for storing static information and instructions for processor 2204. A storage device 2210, such as a magnetic disk or optical disk, is provided and coupled to bus 2202 for storing information and instructions.

Computer system 2200 may be coupled via bus 2202 to a display 2212, such as a cathode ray tube (CRT), for displaying information to a computer user. An input device 2214, including alphanumeric and other keys, is coupled to bus 2202 for communicating information and command selections to processor 2204. Another type of user input device is cursor control 2216, such as a mouse, a trackball, or cursor direction keys for communicating direction information and command selections to processor 2204 and for controlling cursor movement on display 2212. This input device typically has two degrees of freedom in two axes, a first axis (e.g., x) and a second axis (e.g., y), that allows the device to specify positions in a plane.

The claimed subject matter is related to the use of computer system 2200 for real-time audience measurement. According to one embodiment, real-time audience measurement is provided by computer system 2200 in response to processor 2204 executing one or more sequences of one or more instructions contained in main memory 2206. Such instructions may be read into main memory 2206 from another computer-readable medium, such as storage device 2210. Execution of the sequences of instructions contained in main memory 2206 causes processor 2204 to perform the process steps described herein. One or more processors in a multi-processing arrangement may also be employed to execute the sequences of instructions contained in main memory 2206. In alternative embodiments, hard-wired circuitry may be used in place of or in combination with software instructions to implement the claimed subject matter. Thus, embodiments are not limited to any specific combination of hardware circuitry and software.

The term "computer-readable medium" as used herein refers to any medium that participates in providing instructions to processor 2204 for execution. Such a medium may take many forms, including but not limited to, non-volatile media, volatile media, and transmission media. Non-volatile media includes, for example, optical or magnetic disks, such as storage device 2210. Volatile media includes dynamic memory, such as main memory 2206. Transmission media includes coaxial cables, copper wire and fiber optics, including the wires that comprise bus 2202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 2204 for execution. For example, the instructions may initially be carried on a magnetic disk of a remote computer. The remote computer can load the instructions into its dynamic memory and send the instructions over a telephone line using a modem. A modem local to computer system 2200 can receive the data on the telephone line and use an infrared transmitter to convert the data to an infrared signal. An infrared detector coupled to bus 2202 can receive the data carried in the infrared signal and place the data on bus 2202. Bus 2202 carries the data to main memory 2206, from which processor 2204 retrieves and executes the instructions. The instructions received by main memory 2206 may optionally be stored on storage device 2210 either before or after execution by processor 2204.

Computer system 2200 also includes a communication interface 2218 coupled to bus 2202. Communication interface 2218 provides a two-way data communication coupling to a network link 2220 that is connected to a local network 2222. For example, communication interface 2218 may be an integrated services digital network (ISDN) card or a modem to provide a data communication connection to a corresponding type of telephone line. As another example, communication interface 2218 may be a local area network (LAN) card to provide a data communication connection to a compatible LAN. Wireless links may also be implemented. In any such implementation, communication interface 2218 sends and receives electrical, electromagnetic or optical signals that carry digital data streams representing various types of information.

Network link 2220 typically provides data communication through one or more networks to other data devices. For example, network link 2220 may provide a connection through local network 2222 to a host computer 2224 or to data equipment operated by an Internet Service Provider (ISP) 2226. ISP 2226 in turn provides data communication services through the worldwide packet data communication network now commonly referred to as the "Internet" 2228. Local network 2222 and Internet 2228 both use electrical, electromagnetic or optical signals that carry digital data streams. The signals through the various networks and the signals on network link 2220 and through communication interface 2218, which carry the digital data to and from computer system 2200, are exemplary forms of carrier waves transporting the information.

Computer system 2200 can send messages and receive data, including program code, through the network(s), network link 2220 and communication interface 2218. In the Internet example, a server 2230 might transmit a requested code for an application program through Internet 2228, ISP 2226, local network 2222 and communication interface 2218. In accordance with the claimed subject matter, one such downloaded application provides for real-time audience measurement as described herein.

The received code may be executed by processor 2204 as it is received, and/or stored in storage device 2210, or other non-volatile storage for later execution. In this manner, computer system 2200 may obtain application code in the form of a carrier wave.

In the foregoing specification, the claimed subject matter has been described with reference to specific embodiments thereof. It will, however, be evident that various modifications and changes may be made thereto without departing from the broader spirit and scope of the claimed subject matter. The specification and drawings are, accordingly, to be regarded in an illustrative rather than a restrictive sense.

What is claimed is:

1. A method comprising:
    receiving, at a first server, an instant message from a client system comprising television viewer data, wherein the television viewer data includes:
        a user client operational command input
        and an identity of media content and
    the television viewer data specifies the first server as recipient of the instant message, wherein the instant message is sent over an SSL connection that is maintained between the first server and the client system, and wherein the SSL connection is automatically reconnected if the connection is dropped;
    analyzing data from the television viewer data;
    generating output information using the analyzed data; and
    transmitting the output information using the analyzed data to a second server.

2. The method of claim 1, wherein the client system is a digital video recorder (DVR) and the media content is a video program.

3. The method of claim 1, wherein user client operational command input comprises at least one of: fast forward, rewind, pause, play, or data resulting from selecting a designated button on a remote control device that is in communication with the DVR.

4. The method of claim 1, wherein generated output information comprises at least one of: reports, displays, notifications, or other output information that describe aspects of a real-time operation of a population of DVRs.

5. The method of claim 1, wherein analyzing data from the television viewer data further comprises:
    aggregating, in real-time, data from other television viewer data received from one or more other client systems and the data from the received television viewer data;
    wherein the output information comprises real-time audience measurement, based, in part, on the aggregated data.

6. The method of claim 1, wherein analyzing data from the television viewer data further comprises at least one of:
    aggregating viewer behavior in relation to a particular television video program;
    aggregating viewer response to particular commercial pods;
    aggregating viewer behavior in relation to tuning out of a particular television program and viewer tune-in destinations;
    predicting viewing behavior or program ratings; or
    predicting demographic response to programs that are similar to one another, derived from correlating specific information about DVRs with demographic information about households that own the DVRs.

7. The method of claim 5, wherein the aggregated data comprise information that is relevant to the client system, and further comprising:
    in response to aggregating data from the television viewer data, sending the relevant information to the client system.

8. The method of claim 1, wherein the identity of the media content comprises an identity of the particular segment within the media content designate a bookmark, and further comprises:
    forwarding data reflecting the bookmark to any of:
        one or more social network applications that are associated with the user and that are communicatively connected to the first server; or
        a portable device in the form of a textual, visual, or audible message.

9. The method of claim 1, wherein the media content comprises in-band tags and wherein the television viewer data comprise data reflecting tracked data that was stored or processed during playing of particular events in the tagged media content.

10. A system comprising:
    communications circuitry; and
    control circuitry configured to:
        receive, at a first server, an instant message from a client system comprising television viewer data, wherein the television viewer data includes:
            a user client operational command input; and
            an identity of media content; and
        the television viewer data specifies the first server as recipient of the instant message, wherein the instant message is sent over an SSL connection that is maintained between the first server and the client system, and wherein the SSL connection is automatically reconnected if the connection is dropped;
        analyze data from the television viewer data;
        generate output information using the analyzed data; and transmit the output information using the analyzed data to a second server.

11. The system of claim 10, wherein the client system is a digital video recorder (DVR) and the media content is a video program.

12. The system of claim 10, wherein user client operational command input comprises at least one of: fast forward, rewind, pause, play, or data resulting from selecting a designated button on a remote control device that is in communication with the DVR.

13. The system of claim 10, wherein generated output information comprises at least one of: reports, displays, notifications, or other output information that describe aspects of a real-time operation of a population of DVRs.

14. The system of claim 10, wherein the control circuitry is further configured, when analyzing data from the television viewer data, to:
    aggregate, in real-time, data from other television viewer data received from one or more other client systems and the data from the received television viewer data;
    wherein the output information comprises real-time audience measurement, based, in part, on the aggregated data.

15. The system of claim 10, wherein the control circuitry is further configured, when analyzing data from the television viewer data, to perform at least one of:
    aggregate viewer behavior in relation to a particular television video program;
    aggregate viewer response to particular commercial pods;
    aggregate viewer behavior in relation to tuning out of a particular television program and viewer tune-in destinations;
    predict viewing behavior or program ratings; or
    predict demographic response to programs that are similar to one another, derived from correlating specific information about DVRs with demographic information about households that own the DVRs.

16. The system of claim 10, wherein the aggregated data comprise information that is relevant to the client system, and further comprising:
    in response to aggregating data from the television viewer data, sending the relevant information to the client system.

17. The system of claim 10, wherein the identity of the media content comprises an identity of the particular segment within the media content designate a bookmark, and control circuitry is further configured to:
    forward data reflecting the bookmark to any of:
        one or more social network applications that are associated with the user and that are communicatively connected to the first server; or
        a portable device in the form of a textual, visual, or audible message.

18. The system of claim 10, wherein the media content comprises in-band tags and wherein the television viewer data comprise data reflecting tracked data that was stored or processed during playing of particular events in the tagged media content.

* * * * *